US006965405B1

(12) United States Patent
Ogino et al.

(10) Patent No.: US 6,965,405 B1
(45) Date of Patent: Nov. 15, 2005

(54) IMAGING PICKUP APPARATUS WITH CONTROL INFORMATION CAPABLE OF BEING STORED TO DETACHABLY ATTACHED MEMORY

(75) Inventors: Hiroyuki Ogino, Kanagawa-ken (JP); Shigeo Yamagata, Kanagawa-ken (JP); Masaki Nakano, Kanagawa-ken (JP); Masaki Okada, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 445 days.

(21) Appl. No.: 08/818,245

(22) Filed: Mar. 14, 1997

Related U.S. Application Data

(63) Continuation of application No. 08/440,328, filed on May 12, 1995, now abandoned, which is a continuation of application No. 08/116,329, filed on Sep. 3, 1993, now abandoned.

(30) Foreign Application Priority Data

| Sep. 10, 1992 | (JP) | 4-242077 |
| Dec. 21, 1992 | (JP) | 4-356252 |
| Dec. 24, 1992 | (JP) | 4-357632 |
| Dec. 24, 1992 | (JP) | 4-357634 |

(51) Int. Cl.$^7$ ............................................. H04N 5/76
(52) U.S. Cl. ................................ 348/231.7; 358/523
(58) Field of Search ........................ 348/222, 223, 348/225, 231, 232–234, 655, 690, 231.7, 348/231.8, 231.9; 358/906, 335, 520, 523, 358/516; 354/412; 396/310, 311, 320, 321; 386/21, 35, 109; 382/167

(56) References Cited

U.S. PATENT DOCUMENTS 4,855,814 A * 8/1989 Shiraishi et al. ............... 358/29

| 4,922,335 | A | * | 5/1990 | Outa et al. ...................... 358/86 |
| 5,034,804 | A | * | 7/1991 | Sasaki et al. ................ 348/232 |
| 5,086,345 | A | * | 2/1992 | Nakane et al. .............. 358/335 |
| 5,091,787 | A | * | 2/1992 | Watanabe et al. ........... 348/233 |
| 5,153,729 | A | * | 10/1992 | Saito ........................... 358/209 |
| 5,153,730 | A | * | 10/1992 | Nagasaki et al. ............ 348/231 |
| 5,200,813 | A | * | 4/1993 | Jeon ............................ 348/223 |
| 5,200,863 | A | * | 4/1993 | Orii ............................. 360/35.1 |
| 5,206,716 | A | * | 4/1993 | Tuguchi et al. .............. 348/223 |
| 5,231,501 | A | * | 7/1993 | Sakai ........................... 348/231 |
| 5,260,795 | A | * | 11/1993 | Sakai ........................... 348/232 |
| 5,274,457 | A | * | 12/1993 | Kobayashi et al. .......... 348/233 |

(Continued)

FOREIGN PATENT DOCUMENTS

| JP | 02-044993 | 2/1990 |
| JP | 02-203684 | 8/1990 |
| JP | 03-038986 | 2/1991 |
| JP | 03-268590 | 11/1991 |

Primary Examiner—Yon J. Couso
(74) Attorney, Agent, or Firm—Cowen, Liebowitz & Latman, P.C.

(57) ABSTRACT

Upon detection of the attachment of a recording medium, an image signal obtained by taking a picture and condition information representing a condition in which the picture is taken are read out from a memory in an image pickup apparatus and recorded on the recording medium. The apparatus is also arranged in such a manner that the condition information recorded on the recording medium may be transferred to the memory. With this arrangement, it becomes possible to process the image signal by using the condition information stored in the memory, even in a situation in which the recording medium is detached. Furthermore, it becomes possible to inherit the condition information even when the recording medium is exchanged.

15 Claims, 12 Drawing Sheets

U.S. PATENT DOCUMENTS

| | | | |
|---|---|---|---|
| 5,283,632 A | * | 2/1994 | Suzuki et al. ................ 358/223 |
| 5,335,072 A | * | 8/1994 | Tanaka et al. ............... 348/233 |
| 5,477,264 A | * | 12/1995 | Sarbadhikari et al. ...... 348/233 |
| 5,497,191 A | * | 3/1996 | Yoo et al. .................... 348/208 |
| 5,631,983 A | * | 5/1997 | Ohnishi et al. ............. 362/284 |
| 5,696,840 A | * | 12/1997 | Usami ........................ 382/167 |

* cited by examiner

FIG.11
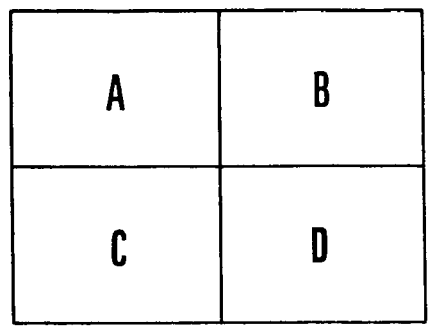
FIG.12
| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |
FIG.13
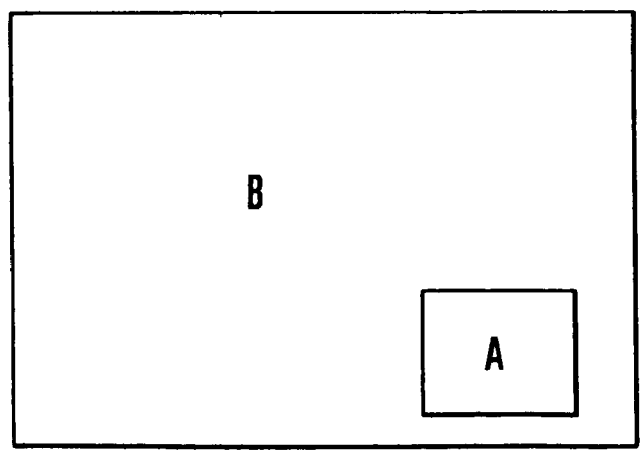

FIG.15
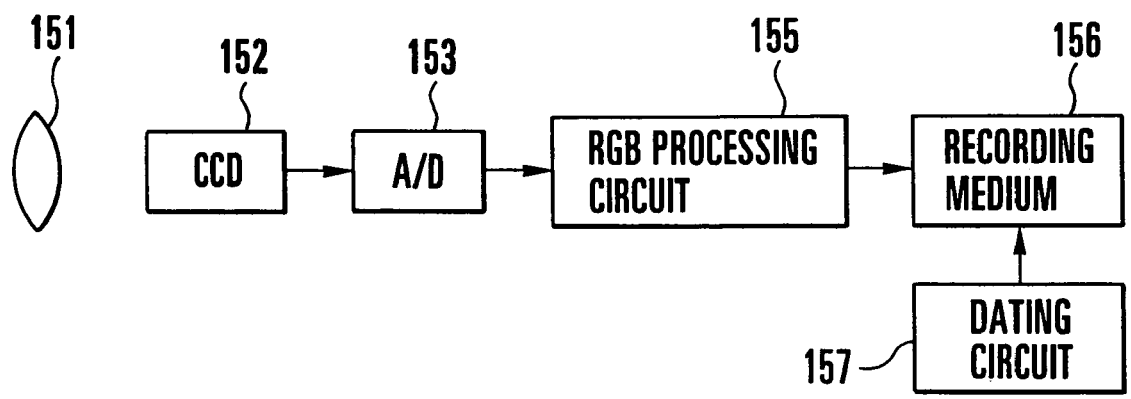
FIG.16
| Mg | G | Mg | G | Mg | G |
|----|----|----|----|----|----|
| Cy | Ye | Cy | Ye | Cy | Ye |
| G | Mg | G | Mg | G | Mg |
| Cy | Ye | Cy | Ye | Cy | Ye |
FIG.17
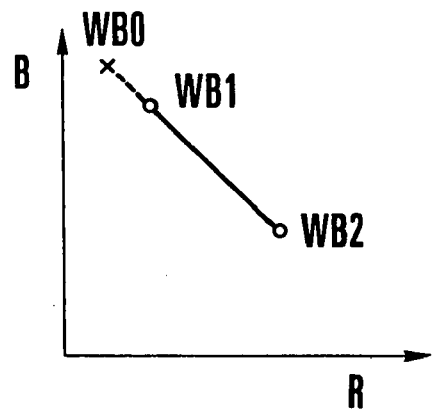

IMAGING PICKUP APPARATUS WITH CONTROL INFORMATION CAPABLE OF BEING STORED TO DETACHABLY ATTACHED MEMORY

This is a continuation application under 37 CFR 1.62 of prior application Ser. No. 08/440,328, filed May 12, 1995 now abandoned, which is a continuation of Ser. No. 08/116,329, filed Sep. 3, 1993 (abandoned).

BACKGROUND OF THE INVENTION

1. Field of the Invention

The present invention relates to imaging apparatus, more particularly, to a manner of dealing with control data in signal processing performed in a reproducing apparatus or a recording apparatus.

2. Description of the Related Art

Various types of apparatus are known for recording and reproducing pictures in which the image signals of objects are produced by a solid-state image sensor such as a CCD, then after signal-processing, these image signals are recorded on a recording medium such as a magnetic tape and a magnetic disk. As an example, an electronic still camera records an object image on a recording medium as a still image. Control of white balance (hereafter referred to as WB) for color image signals obtained by taking the picture is an example of signal processing performed on the image signals depending on the data representing the condition under which a picture is taken.

Two known technologies for automatically performing WB control are an external WB method and an internal WB method called a TTL (Through the Lens) method.

In the external WB method, for example, the ratio of the red (R) component to the blue (B) component is determined for the light passing through the filters disposed on a front surface of a camera and the resulting ratio is used as WB data. In the TTL method, on the other hand, a picture of a reference object is taken before taking a picture of an actual object and the image signal of the reference object is used to performed WB control.

Comparing these two methods of WB control, the TTL method is generally more advantageous than the external WB method with regard to the size and cost of apparatus. In either case, WB control is carried out on the image signal obtained by taking a picture, and then the image is recorded on a recording medium as image color signals which are controlled in gain to a desired value.

One possible arrangement is to record the data for use in signal processing such as WB control on a recording medium together with normal image signals obtained by taking a picture. This arrangement is useful to reduce the requirement of memory capacity of the apparatus and to reduce the processing time required for taking a picture, because the WB control may be performed when the picture is reproduced.

However, in the case of such an electronic still camera in which the control data is recorded on a recording medium, if the recording medium is detached from the camera, the WB control data becomes not available, and thus it becomes impossible to perform WB control.

Furthermore, the WB control data associated with even the same reference object will be different depending on the season and the time when the WB data is produced, and also depending on the location where the WB data is produced.

As a result, it is very difficult to make proper utilization of the WB control data which is recorded on the recording medium.

On the other hand, while the TTL method has generally an advantage in the size and cost over the external WB method, in some cases it is impossible to perform as accurate control as required. For example, when the object has a large magnitude of vivid color components, the gain control of the color signals is performed such that the vivid color components are suppressed, and thus the reproduction from image signals obtained by taking a picture lacks vividness in colors.

SUMMARY OF THE INVENTION

In view of the above, it is an object of the present invention to solve the above-described problems and to provide an imaging apparatus in which control data is produced based on state data with regard to image signals representing the condition under which a picture is taken, and the resulting control data as well as image signals obtained by taking the picture is recorded on a recording medium, whereby it becomes possible to use the control data more often and it also becomes possible to increase the recording capacity of image signals.

To achieve the above object, one aspect of the present invention provides an imaging apparatus comprising image pickup means, first memory means capable of storing an image signal outputted from the image pickup means and condition information representing a condition in which the image signal is picked up by the image pickup means, second memory means capable of storing the image signal outputted from the image pickup means and the condition information, the second memory means being detachably attached to the apparatus, and control means for controlling the condition information so as to be transferred between the first memory means and the second memory means.

Additional objects and features of the present invention will be more readily apparent from the following detailed description when taken in conjunction with the drawings.

BRIEF DESCRIPTION OF THE DRAWINGS

FIG. 11 is a schematic diagram showing multiple picture reproduction in accordance with the fourth embodiment of the present invention;

FIG. 12 is a schematic diagram showing multiple picture reproduction in accordance with the fifth embodiment of the present invention;

FIG. 13 is a schematic diagram showing multiple picture reproduction in accordance with the fifth embodiment of the present invention;

FIG. 15 is a block diagram showing a seventh embodiment in accordance with the present invention;

FIG. 16 is a schematic diagram showing a configuration of a color filter arranged with additive complementary colors;

FIG. 17 is a graph showing an example of white balance data;

DETAILED DESCRIPTION OF THE PREFERRED EMBODIMENTS

A first embodiment of the present invention will be described below.

Figure 1:
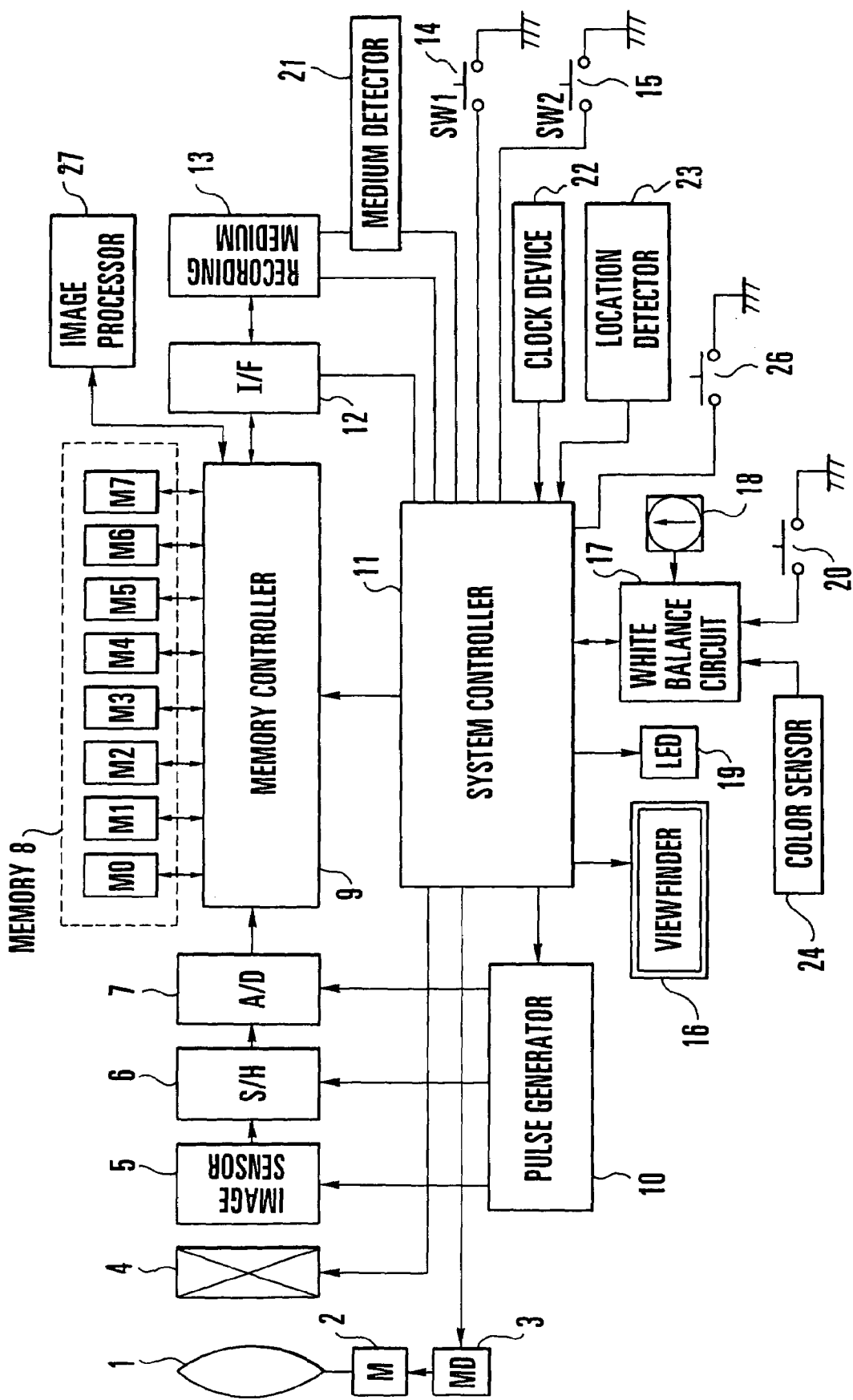
FIG. 1 is a block diagram showing a basic configuration of an electronic still camera in accordance with first and sixth embodiments of the present invention.

FIG. 1 is a block diagram showing a basic configuration of an electronic still camera in accordance with the first embodiment of the present invention.

In FIG. 1, there are shown a camera lens 1, a motor 2 for driving the lens 1, a controller 3 of the motor 2 for driving the lens 1, an element 4 such as a shutter and diaphragm for controlling the amount of light, and a solid-state image sensor 5 such as a CCD. There are also provided a sample-and-hold circuit 6 for sampling and holding signals outputted from the solid-state image sensor 5, an analog-to-digital (A/D) converter 7 for converting the analog output signals from the sample-and-hold circuit 6 into digital signals, a memory 8 such as DRAM, and a memory controller 9 for controlling the operation of reading data from the memory 8 and writing data to the memory 8 and for controlling the refreshing operation of the DRAM.

A pulse generator 10 is also provided for generating a timing signal for use in driving the solid-state image sensor 5, a sample-and-hold pulse for the sample-and-hold circuit 6, and a driving pulse for the A/D converter 7. Furthermore, there are provided a system controller 11 for controlling the operation of the whole system in the apparatus, and an interface 12 between a recording medium 13 and a camera body, which will be described later in more detail. A hard disk is used as the recording medium 13.

There are also shown a standby switch (SW1) 14 for making a camera stand by for taking a picture, a picture-shooting switch (SW2) 15 for commanding the camera to take a picture, an electronic or optical viewfinder 16 detachably attached to the camera, a white balance circuit 17 for performing WB adjustment, a WB mode selection switch 18 for selecting the WB mode, an LED 19 for indicating that the WB mode is set by the above WB mode selection switch 18 to a white paper mode which will be described later in more detail, a white-paper shooting switch 20 for giving the command to take a picture of white paper so as to obtain the color temperature information for use in WB control, a medium detector 21 for determining whether the recording medium 13 is attached to the camera body, a clock device 22 for counting a time and date, and a location detector 23 for determining where the electronic still camera is located by means of electromagnetic waves received from satellites.

In this embodiment, it is assumed that the WB control is carried out by the external WB method, and there are further provided a color sensor 24 for detecting color components in ambient light so as to obtain WB control data, a transfer switch 26 for transferring the WB control data obtained by taking a picture of white paper (hereinafter referred to as white paper WB data) from the hard disk 13 used as a recording medium to the memory 8 in the camera body, and an image processor 27 for performing the processing such as white balance correction and gamma correction on color image signals obtained by taking a picture.

Now, the signal flow in the electronic still camera in accordance with the present embodiment of the invention will be described below.

When a picture is taken to obtain the signal of an image (still image), the image sensor 5 outputs the signal, which is sampled and held by the sample-and-hold circuit 6, thus supplying the color image signal. Then, the color image signal is converted into a digital signal by an A/D converter 7.

The color image signal converted into a digital form is temporarily stored in memory 8. The image signal stored in the memory 8 is processed by the image processor 27, and will be finally recorded on the recording medium 13. There may be various options regarding when the image processor 27 performs its operation. This operation timing adaptable for the electronic still camera of the present embodiment depends on the configuration of the camera. These include the following options:

(1) The image signal (data) stored in the memory 8 is read out and processed by the image processor 27. The resulting signal is stored again in the memory 8. Then, the image signal stored in the memory 8 is read out again and recorded on the recording medium 13 via the interface (I/F) 12.

(2) The image signal stored in the memory 8 is read out and processed by the image processor 27. Then, the resulting signal is recorded on the recording medium 13 via the I/F 12.

(3) The image signal stored in the memory 8 is read out and directly recorded on the recording medium 13 via the I/F 12. The image signal is reproduced from the recording medium 13 via the I/F 12 and it is stored in the memory 8 again. Then it is read out again and processed by the image processor 27. The resulting signal is re-stored in the memory 8 again. Finally, it is read out again and recorded on the recording medium 13 again via the I/F 12.

(4) The image signal stored in the memory 8 is read out and directly recorded on the recording medium 13 via the I/F 12. The image signal is reproduced from the recording medium 13 via the I/F 12 and is supplied directly to the image processor 27 so as to perform the required processing. The processed signal is recorded again on the recording medium 13 via the I/F 12.

(5) The image signal stored in the memory 8 is read out and directly recorded on the recording medium 13 via the I/F 12. The image signal is reproduced from the recording medium 13 via the I/F 12 and is supplied directly to the image processor 27 so as to perform the required processing. The processed signal is stored again the memory 8 and then it is read out again and recorded again on the recording medium 13 via the I/F 12.

(6) The image signal stored in the memory 8 is read out and directly recorded on the recording medium 13 via the I/F 12. The image signal is reproduced from the recording medium 13 via the I/F 12 and is stored again in the memory 8. Then the signal is read out again from the memory 8 and is processed by the image processor 27. The resulting signal is recorded again on the recording medium 13 via the I/F 12.

The flow of the signal in WB control, which is one of characteristic features of the present embodiment, will be describe next. The image data for one picture obtained by taking a picture of white paper is stored in the memory 8. Then, the image processor 27 accesses this image data for one picture and extracts portions of the image data. This extracted data is stored again as white paper WB data in the memory 8. The extraction method to generate white paper WB data may be any method by which the total required amount of information can be reduced. Such methods include (a) extracting the image data for one line of every several lines from the image data for one picture, (b) extracting only a central portion of the image data, (c) extracting a pixel data every predetermined constant number of pixels from the whole of the image data for one picture.

The white paper WB data obtained in this way is transferred from the memory 8 to the hard disk 13 via the I/F 12 as will be described later in more detail. This leads to the reduction in the amount of the white paper WB data recorded on the hard disk 13, which further leads to avoidance of the great reduction in recording capacity for color image signals obtained by taking actual (usual) pictures.

When a still image is taken in the white paper mode, the image signal corresponding to the still image is stored in the memory 8. The image processor 27 gets this image signal and also reads the white paper WB data stored in the memory 8 or recorded on the recording medium 13. Then, the image processor 27 corrects the white balance of the image signal corresponding to the still image by using color temperature information which is formed from the white paper WB data. The timing of correction may be selected from the options (1)–(6) described above.

The color sensor (WB) 24 provides its output to the WB circuit 17, and thus the color temperature information (outside data) is always available. When a still image is taken in the automatic mode, this outside data is inputted into the system controller 11 and further supplied to the image processor 27 via the memory controller 9. As described earlier, the image processor 27 reads the image signal corresponding to the still image stored in the memory 8 and corrects its WB by using the outside data. This timing of correction may also be selected from the options (1)–(6) described above.

Figure 2:
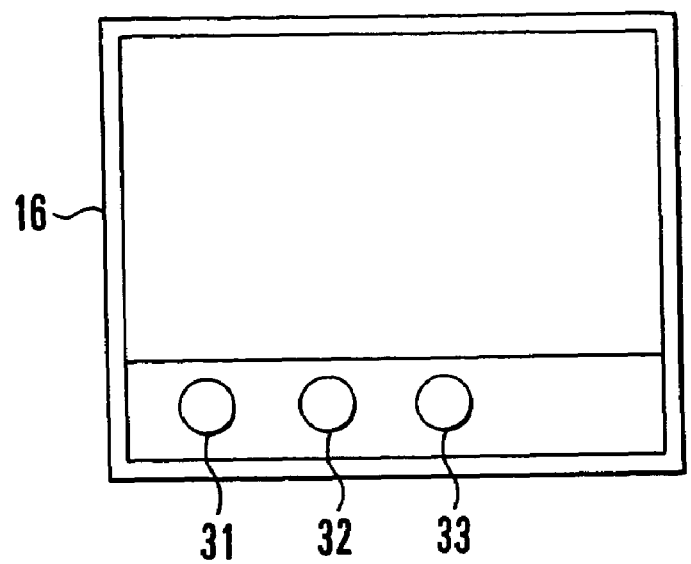
FIG. 2 is a schematic representation of a display of a viewfinder for use in an electronic still camera shown in FIG. 1.

FIG. 2 shows a display screen of the viewfinder 16 shown in FIG. 1. In FIG. 2, there are shown LEDs 31, 32, and 33 used for indication. The LED 31 turns on when the WB mode selection switch 18 is set to the white paper mode. The LED 32 turns on when the WB mode selection switch 18 is set to the setting mode. The LED 33 turns on when the generation of the white paper WB data has been completed.

Figure 3:
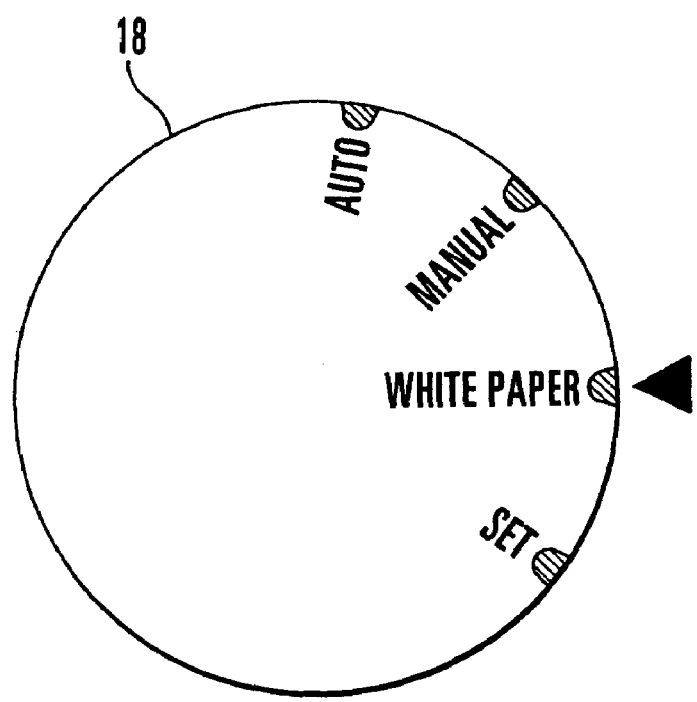
FIG. 3 shows the appearance of the white balance mode selection switch for use in an electronic still camera shown in FIG. 1.

FIG. 3 shows the appearance of the WB mode selection switch 18. As shown, this switch is of the dial type and the WB control mode can be set to any one of automatic, manual, white paper, and setting modes by rotating the dial so that the arrow points to the corresponding position having the mark "AUTO", "MANUAL", "WHITE PAPER", or "SET". This dial switch functions as a jumping back switch when the dial switch is switched from the "WHITE PAPER" position to "SET" position. Thus, the "SET" position cannot be maintained and the selection will automatically return back to "WHITE PAPER" unless the operator holds the dial at the "SET" position.

In addition to the white paper mode and the automatic mode described above, the WB control modes also include manual mode as can be seen. In this manual mode, WB control value is manually set to any one of four levels, (the number of levels may be less or more than four), by manual operation means (not shown). When the dial switch is set to "SET" position, the setting mode is selected in which information on the color temperature can be generated by taking a picture of white paper with the operation switch 20 for taking a picture of white paper. Thus, it is possible to take a picture of white paper and to generate the information on the color temperature (white paper data).

Figure 4:
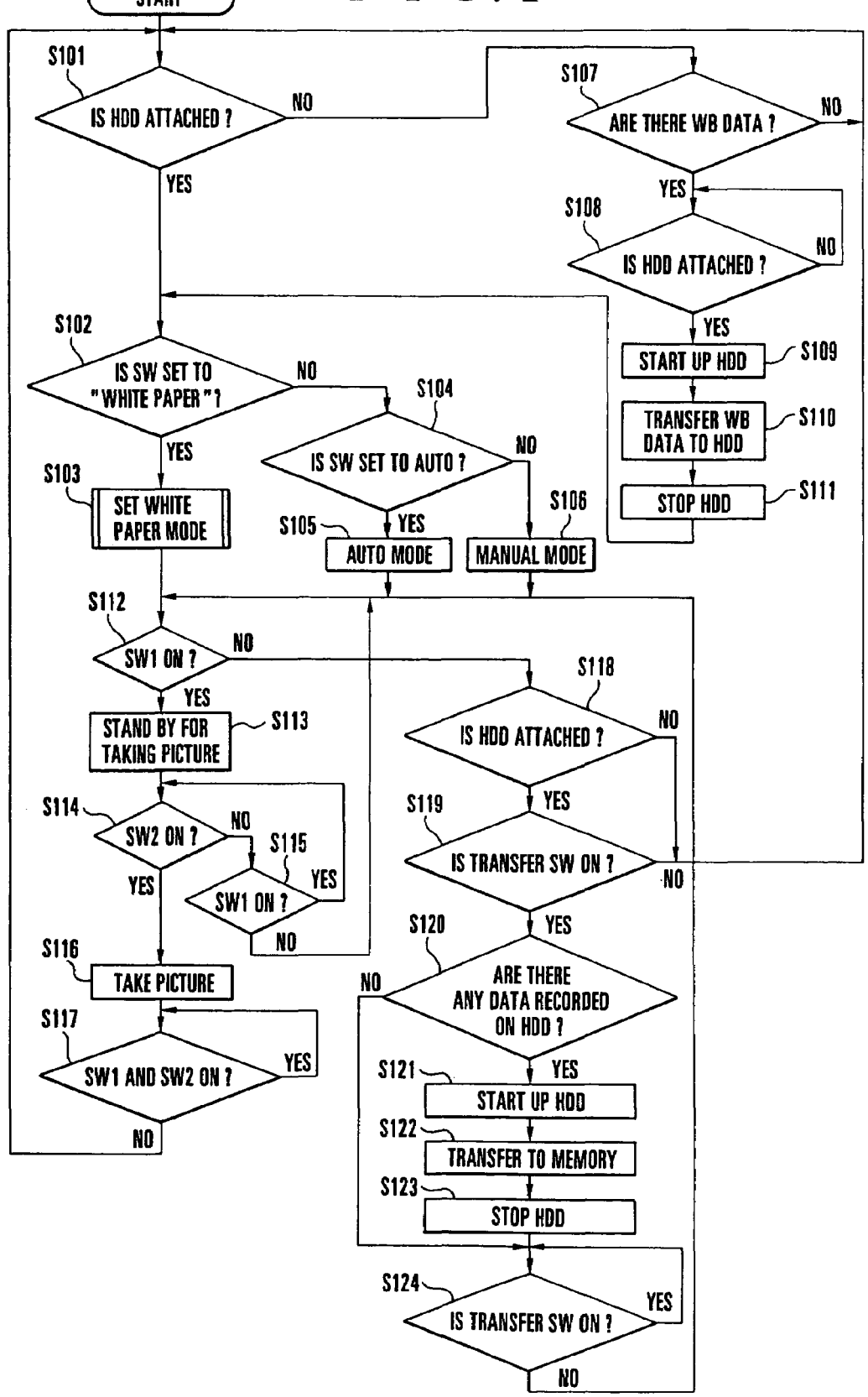
FIG. 4 is a flow chart of the operation with regard to the white balance control in an electronic still camera shown in FIG. 1, mainly illustrating the operation of a system controller.
Figure 5:
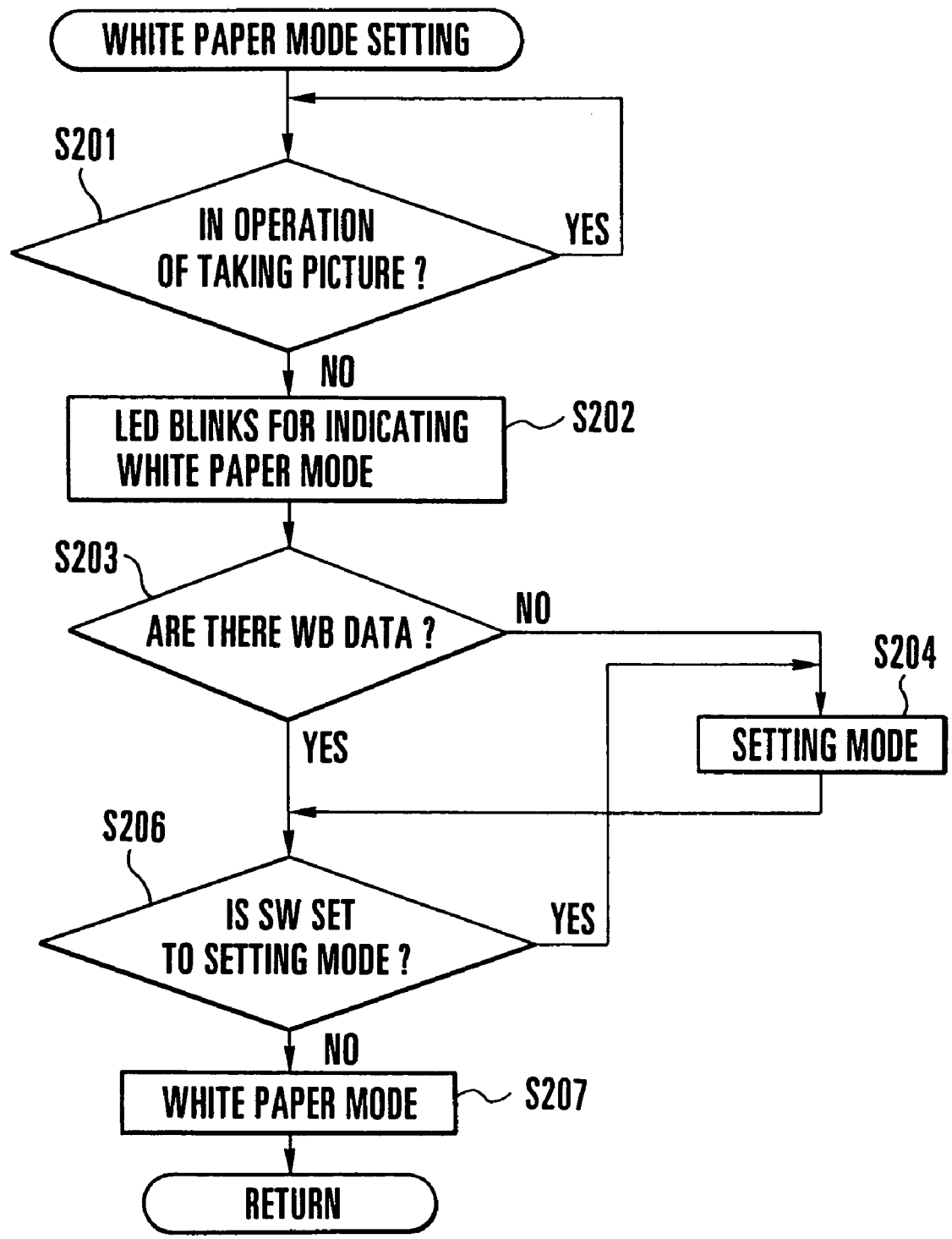
FIG. 5 is a more detailed flow chart illustrating a routine of white paper mode setting shown in FIG. 4.
Figure 6:
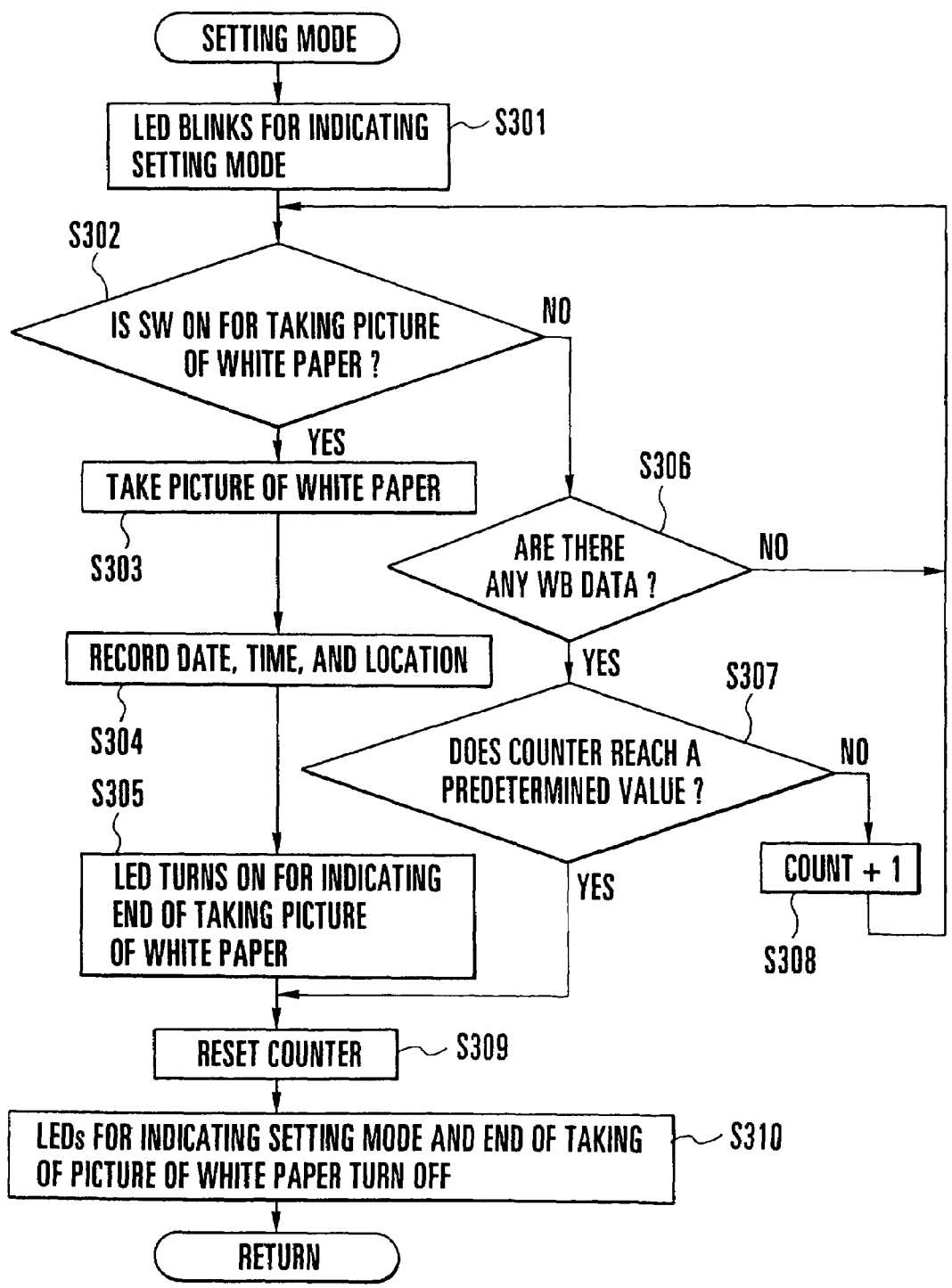
FIG. 6 is a more detailed flow chart illustrating a setting mode routine shown in FIG. 5.

FIG. 4 is a flow chart showing the operation associated with the white balance control in an electronic still camera shown in FIG. 1, in which the operation of the system controller 11 is mainly illustrated. FIG. 5 is a more detailed flow chart illustrating a routine for setting the white paper mode shown in FIG. 4. FIG. 6 is a more detailed flow chart illustrating a setting mode routine shown in FIG. 5. Referring to these flow charts shown in FIGS. 4–6, the operation with regard to the WB control will be described below.

The flow chart of FIG. 4 starts with step S101 when a power switch (not shown) is turned on. This step S101 determines whether the hard disk (HDD) 13 is attached or not, judging from the output of the medium detector 21. If the HDD 13 is not attached, then the operation moves to step S107 which determines whether the white paper data is recorded in the memory 8 installed in the camera body. If there is no white paper data recorded in the memory 8, then the operation returns to step S101.

In step S107, if the conclusion is that there exists the white paper WB data recorded in the memory 8, then the routine enters into step S108 to wait for the HDD 13 to be attached. After completion of the attachment of the HDD 13, the HDD 13 is started up in step S109, and then in step S110, the white paper WB data stored in the memory 8 is transferred to the HDD 13 via the I/F 12. After that, in step S111, the HDD 13 is stopped. Then, the routine proceeds to step S102.

In the above steps, if the HDD 13 is not attached, this means that the camera is not in the operation of taking a picture or otherwise the HDD 13 becomes full of data during operation of taking a picture and there is no room for further data. In the latter case, it is possible to directly use the white paper WB data detected previously. In this case, as will be described later, just prior to the detachment of the HDD 13, the white paper WB data recorded on the HDD 13 is transferred to the memory 8. Thus, when the HDD 13 full of data is detached, the white paper WB data is always left in the memory 8. In step S110, this white paper WB data is recorded on a HDD 13 which is newly attached.

If the conclusion in step S101 is that the HDD 13 is attached already, or if the HDD 13 has been attached newly, then decision is made in step S102 whether the WB mode selection switch 18 is set to the white paper mode. If the white paper mode is not selected, then whether the WB mode selection switch 18 is set to the automatic mode is determined in step S104. In these steps S102 and S103, the selection of the WB mode selection switch 18 is definitely determined, that is to say, it is determined which dial position of "WHITE PAPER", "AUTO", or "MANUAL" is selected. If it is detected in step S104 that the automatic mode is selected, then the WB control is set to the automatic mode in step S105. If it is concluded in step S104 that the automatic mode is not selected, then it is considered that the dial position is set to "MANUAL" and in step S105 the WB control is set to the manual mode described above.

If it is concluded in step S102 that the WB mode selection switch 18 is set to the white paper mode, then the routine proceeds to step S103 in which the white mode setting routine is carried out.

As shown in FIG. 5, in step S201 of the white paper setting routine, it is determined first whether the camera is in a usual operation mode for taking a picture. If the camera is in a usual operation, then the routine waits for completion of the usual operation. If the camera is not in the usual operation or if the usual operation has been completed, the routine proceeds to step S202 in which the LED 31 blinks to indicate that the WB mode selection switch 18 is set to the white paper mode.

Alternatively, in step S202, the LED 31 may be lit continuously instead of blinking, or it may be arranged that a warning sound is generated. Otherwise, the combination of these may also be possible.

In a case where the white paper WB data is produced for the first time by taking a picture of white paper, no white paper WB data is recorded on the HDD 13 or stored in the memory 8. Therefore, in step S203, decision is made whether the white paper WB data exists in the memory 8 or on the HDD 13, and if there exists no such data, then the routine proceeds to step S204 so as to perform the setting-mode routine in which the white paper WB data is surely established.

On the other hand, if the white paper WB data already exists in the memory 8 or on the HDD 13, it is possible to perform the WB control by using this white paper WB data. Thus, except for the case in which the conclusion in step S206 indicates that the WB mode selection switch 18 is set to the setting mode, the routine proceeds to step S207 in which the WB control is set to the white paper mode, and then the routine returns to the main routine.

When step S203 concludes that no white paper WB data exists in the memory 8 or on the HDD 13, or when step S206 concludes that the WB mode selection switch 18 is set to the setting mode, the routine enters into step S204 so as to perform the setting-mode routine.

In this setting-mode routine, the white paper WB data is established as will be described in more detail hereinbelow, then the routine returns to the main routine.

Referring to the flow chart shown in FIG. 6, the setting-mode routine will be described. In the first step of the setting-mode routine, S301, the LED 32 blinks to indicate that the WB control is in the setting mode. Then, in step S302, the routine waits for the operation switch 20 used for taking a picture of white paper to be turned on. In this case, the decision is made in step S306 whether the white paper WB data exists in the memory 8 or on the HDD 13.

If no white paper WB data exists, it is required to newly produce white paper WB data. Thus, in this case, the routine returns to step S302 so as to further wait for the operation switch 20 used for taking a picture of white paper to be turned on. On the other hand, if the white paper WB data already exists in the memory 8 or on the HDD 13, this means that the WB mode selection switch 18 is set to "SET" position, that is to say, it is desired to update the white paper WB data. However, if the operation switch 20 used for taking a picture of white paper is not turned on for a predetermined time, the data is not updated. In this case, the routine proceeds to step S307 so as to determine whether the counted value of the counter in the system controller 11 reaches a predetermined value. If the counted value is less than the predetermined value, the value is incremented in step S308. If the counted value reaches the predetermined value with no event of turning-on of the operation switch 20 used for taking a picture of white paper, then the routine proceeds to step S309 in which the counter is reset without any new setting of the white paper WB data, and thus the routine automatically cancels the setting mode.

If, in step S302, the operation switch 20 used for taking a picture of white paper is turned on, the routine proceeds to step S303 in which a picture of white paper is taken by operating the image sensor 5 and other required devices so as to produce new white paper WB data and the resulting data is stored in the memory 8. Further, in step S304, the information on the time and data obtained from the clock device 22, the information of the location on the earth obtained from the location detector 23 and the white paper WB data newly produced, are all together recorded on the HDD 13 via the I/F 12.

After that, in step S305, the LED 33 turns on to indicate the completion of taking a picture of white paper. Again in this step S305, alternatively, the LED 33 may blink instead of continuously lighting, or it may be arranged that a warning sound is generated, or the combination of these may also be possible.

After these steps are completed, the routine passes via step S309 to step S310 in which the LED 32 used for indication that the WB control is in the setting mode and the LED 33 used for indicating the completion of taking a picture of white paper are both turned off. Then, the routine returns to step S206 in the white paper mode setting routine. That is to say, the routine returns to the main routine after the WB control mode is set to the white paper mode.

In these steps described above, the WB control mode is determined. In this situation, by operating the standby switch SW1 (14) and the operation switch SW2 (15) for taking a picture, it is possible to perform the usual operation for taking a still image in the specified WB control mode. That is to say, step S112 determines whether the standby switch SW1 (14) is turned on. If the conclusion is positive, the routine proceeds to step S113 so as to make the operation be in the standby mode for taking a picture by operating autofocusing function and autoirising function.

In this standby mode, step S114 determines whether the operation switch SW2 (15) used for taking a picture is turned on. If the operation switch SW2 is turned on, a still image is taken in step S116. Step S115 detects the occurrence of turning-off of the standby switch SW1 (14) before the occurrence of turning-on of the operation switch SW2 (15) for taking a picture. Upon this occurrence, the routine returns to step S112. Step S117 determines whether both of the standby switch SW1 (14) and the operation switch SW2 (15) for taking a picture are turned off after completion of taking a still image. If the conclusion is positive, the routine returns to step S101.

After the WB control mode has been set as previously described, step S118 determines whether the HDD 13 is attached to the camera body. If the HDD 13 is attached, decision is made in step S119 whether the transfer switch 26 is turned on. If the conclusion is positive, the routine proceeds to step S120. If the HDD 13 is not attached, or if the transfer switch 26 is not turned on, then the routine returns to step S101.

The transfer switch 26 is operated to transfer the white paper WB data stored on the HDD 13 to the memory 8 before the HDD 13 is detached for exchange. When the transfer switch 26 is turned on, decision is made in step S120 whether the white paper WB data is recorded on the HDD 13. If there is no such data, no operation occurs and the routine proceeds to step S124. In step S124, when turning-off of the transfer switch 26 is confirmed, the routine returns to step S112.

If step S120 concludes that the HDD 13 has the white paper WB data, the routine proceeds to step S121 to start up the HDD 13. Further, in step S122, the white paper WB data recorded on the HDD 13 is transferred to the memory 8 via the I/F 12. After that, in step S123, the HDD 13 is stopped. Then, in step S124 if turning-off of the transfer switch 26 is detected, the routine returns to step S112.

After the white paper WB data recorded on the HDD 13 which is going to be detached for exchange is transferred to the memory 8 in the camera body as described above, another HDD is attached. Then, in steps S107–S111 as described above, the white paper WB data is automatically transferred to the newly attached HDD. Thus, the white paper WB data is inherited.

With the arrangement described above, even in a case where the HDD 13 is detached, the WB control data stored in the memory 8 can be used to perform the WB control. Besides, the WB control data can be inherited when the HDD 13 is exchanged. Thus, it becomes possible to increase the opportunity to use available white paper WB data and it also becomes possible to increase the possibility of performing better WB control.

When the white paper WB data is produced in the WB setting mode for the above electronic still camera, if a picture of the white paper is taken with illumination of a fluorescent lamp in a room, the flicker of the fluorescent lamp may be detected so as to reduce the influence of the flicker by setting the shutter to the proper speed depending on the detected flicker. For example, the shutter speed may be set to an integer multiple of the flicker cycle. Alternatively, when the flicker cycle is given as a constant value such as 1/100 sec. or 1/120 sec., the shutter speed may be set to for example 1/20 sec.

In the embodiment described hereinabove, an HDD is used as a recording medium. However, alternatively, a semiconductor memory card or other type magnetic recording medium may be also used in an imaging apparatus in accordance with the present invention.

In accordance with the present embodiment of the invention, as described above, the WB control data is generated from the color image signal outputted from the image pickup means. When the attachment of the recording medium is detected, correspondingly the WB control data is read from the internal memory means and is recorded on the recording medium. In addition, the WB control data recorded on the recording medium may be transferred to the internal memory means. Thus, even if the recording medium is detached, the WB control data stored in the internal memory means may be used to perform WB control. Besides, the WB control data may be inherited when the HDD 13 is exchanged. Thus, it becomes possible to increase the opportunity to use available white paper WB data and it also becomes possible to increase the possibility of performing better WB control.

When the color image signal outputted from image pickup means is recorded as WB control data on the recording medium, only a portion of the color image signal may be recorded as the WB control data so as to minimize the reduction in the recording capacity for color image signals for usual pictures.

Now, a second embodiment of the present invention will be described hereinbelow.

In the first embodiment, the WB control data is generated and recorded together with the image signals. However, in some cases, as previously described, sufficiently high accuracy control cannot be achieved. This second embodiment provides an imaging apparatus which can overcome this disadvantage.

Figure 7:
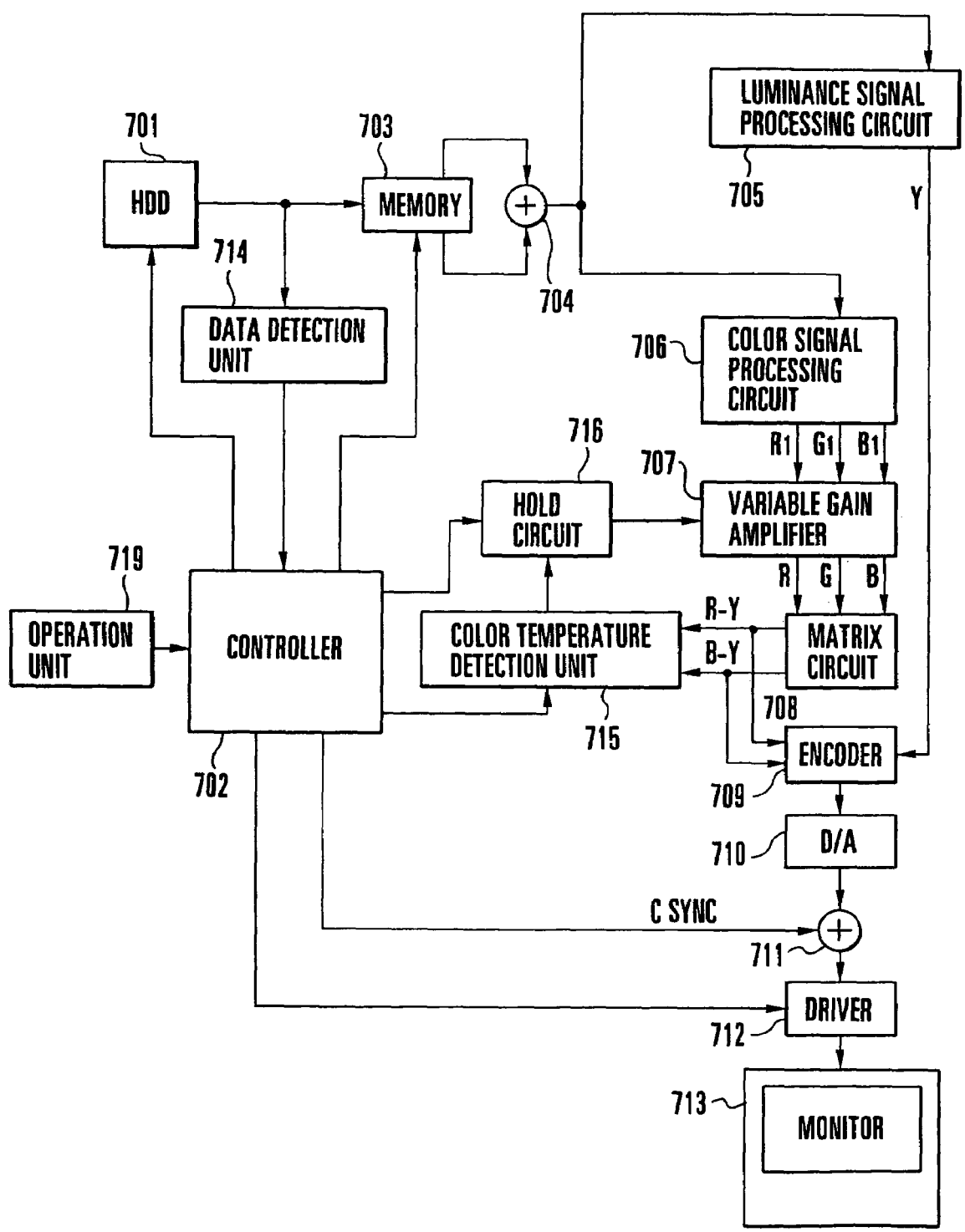
FIG. 7 is a block diagram showing a second embodiment in accordance with the present invention.

In this embodiment, an electronic still camera will be taken again as an example to which the present invention is applied. FIG. 7 shows a video reproducing apparatus in accordance with the second embodiment of the present invention.

In FIG. 7, there is shown an HDD 701 which is detachably attached to the video reproducing apparatus and which is used as a video recording medium. There are also shown a controller 702 for controlling the whole of apparatus including the HDD 701, a memory 703 used for storing the video signal read from the HDD 701 under the control of the controller 702, an adder 704 by which signals read from the memory 703 are added to each other as described later, and a luminance signal processing circuit 705 for processing the signals outputted from the adder 704 so as to produce a luminance signal Y.

A color signal processing circuit 706 is also shown in FIG. 7 for producing color signals $R_1$, $G_1$, and $B_1$ from the video signal provided from the adder 704. A variable gain amplifier 707 controls the gains of respective color signals $R_1$, $G_1$, and $B_1$ and outputs the resulting signals R, G and B. There are also provided a matrix circuit 708 for performing matrix processing on the color signals R, G, and B so as to produce color-difference signals R-Y and B-Y, an encoder 709 for producing a composite video signal from the color-difference signals R-T, B-Y and the luminance signal Y described above, a D/A converter 710 for converting the composite video signal to an analog signal, an adder 711 for adding a synchronizing signal from the controller 702 to the composite video signal which has been D/A-converted, a driver 712 which inputs the composite video signal added with the synchronizing signal and which operates under the control of the controller 702, a monitor 713 for displaying a video image under the control of the driver 712, and an operation unit 719 used for operating various switches.

Furthermore, there are shown a data detection unit 714 which detects the designation data associated with WB, which will be described later in more detail, from the signal read from the HDD 701 so as to provide the detected designation data to the controller 702, a color temperature detection unit 715 for detecting the color temperature of the video signal from the previously described color-difference signals R-Y and B-Y under the control of the controller 702, and a hold circuit 716 for holding the detected color temperature which is used as the WB control value for controlling the gain of the variable gain amplifier 707.

Figure 8:
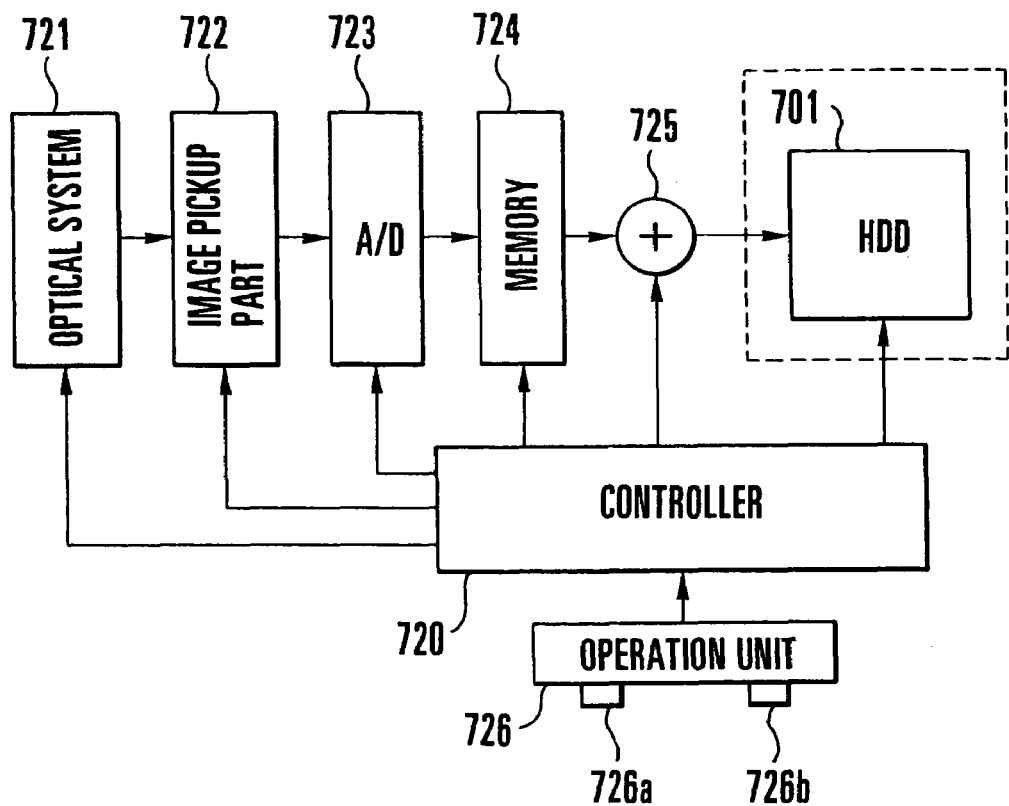
FIG. 8 is a block diagram showing a configuration of a camera unit of the second through fifth embodiments in accordance with the present invention.

FIG. 8 shows a camera unit for taking a picture of an object and for recording the image of the object on the HDD 701 previously described. The HDD 701 is detachably attached to the camera unit. After the image data associated with the pictures taken by the camera unit is recorded on this HDD 701, the HDD 701 is detached from the camera unit and attached to the video reproducing apparatus shown in FIG. 7 to reproduce the images. Alternatively, the camera unit may be arranged in an integral form with the video reproducing apparatus.

In FIG. 8, there are shown a controller 720 for controlling the total system of the camera unit, an optical system 721 including a lens, a diaphragm and the like, an image pickup part 722 including a CCD used as an image sensor. This CCD has color filters such as those shown in FIG. 9 arranged for each pixel. As shown, the color filter comprises two types of lines: one comprises Mg (magenta) and G (green) which are arranged alternatively, and the other one comprises Cy (cyan) and Ye (yellow) which are arranged alternatively, wherein the location alternates between Mg and G line to line to form so-called checkered arrangement with additive complementary colors.

There are also shown an A/D converter 723 for performing A/D conversion on the signal obtained by photoelectric conversion with the image pickup part 722, and a memory 724 such as a semiconductor memory for storing image data for one picture in the digital form obtained by photoelectric conversion with the above CCD. Furthermore, there is provided an adder 725 which adds the signal read from the memory 724 to the designation data associated with WB from the controller 720 and which outputs the resulting signal so as to record it on the HDD 701. An operation unit 726 is also shown which has various switches including a designation switch used for producing designation data.

Now, the operation in the above arrangement will be described below.

In this embodiment, a plurality of pictures are taken with the camera unit shown in FIG. 8 and a plurality of video signals thereof are recorded on the HDD 701. One of these video signals is designated as a reference video signal, which is to be used as reference to produce the control data for WB control in reproducing process. Then, the designation data representing the above fact, the reference video signal, and the location data representing the location thereof are all together recorded on the HDD 701. As for the other remaining video signals, the designation data (corresponding to the location data of the reference video signal) designating the location of the video signal which is to be used as the reference video signal to perform WB control when reproducing it, is recorded together with respective video signal.

In the above procedure, the signal obtained by taking a picture for example to a neutral gray reference board or an object including a large amount of white components is used as the reference video signal.

In reproduction, the reference video signal is taken from the above plurality of video signals and it is reproduced so as to obtain the WB control data. This control data is used to determine the gain of the variable gain amplifier 707. When the other video signals are reproduced, WB control is performed by using this WB control data.

Now, detailed descriptions will be given hereinbelow on the operation of recording and reproducing.

In the camera unit shown in FIG. 8, the operation unit 726 has a switch 726a used for determining whether the signal which is about to be obtained by taking a picture is designated as the reference video signal used as the WB control data in reproduction. There is also provided a switch 726b which is used, in the case the switch 726a is set such that the signal which is about to be obtained by taking a picture is not adopted as the reference video signal, to designate which of video signals will be used as the reference video signal. These switches may be set by an operator before taking a picture of an object. When a video signal is stored on the HDD 701, the information established by setting these switches is provided as designation information from the controller 720 to the adder 725, and then this information is recorded on the HDD 701 when the video signal is recorded. With reference to FIG. 8, when a release switch in the operation unit 726 is operated, the controller 720 controls the diaphragm in the optical system 721 and determines the exposure time so as to give a proper exposure to the CCD in the image pickup part 722. In this way, the optical system 721 and the image pickup part 722 are controlled. Then, the signal is read from the properly exposed CCD, and the resulting signal is inputted to the A/D converter 723 in which the electrical signal corresponding to an individual pixel of the CCD is converted into a digital signal. The signal corresponding to the pixel of the CCD from the A/D converter 723 is inputted to the memory 724, and is stored temporarily in it.

Then, the signal is transferred from the memory 724 to the HDD 701. Prior to the reading of a signal from the memory 724, the controller 720 outputs the designation data which represents whether the signal being obtained at that time by taking a picture will be used as the reference video signal in reproduction to produce the WB control data and which represents the recording area (location) where the reference video signal to be used in reproduction is recorded in the case in which the above signal obtained at that time by taking a picture will not be used as the reference video signal. This designation data from the controller 720 is recorded on the HDD 701 at the prescribed recording area (location). Then, the controller 720 controls the memory 724 and reads the signal stored in the memory 724. Further the controller 720 records this signal on the HDD 701 at the prescribed recording area via the adder 725.

As described above, the video signal obtained by taking a picture with the camera unit is recorded on the HDD 701 together with the designation data associated with the WB control. Then, the HDD 701 on which the video signal is recorded is detached from the camera unit and attached to the video reproducing apparatus shown in FIG. 7 to reproduce the video signal. Now, this operation will be described below.

With reference to FIG. 7, when the operation unit 719 issues a command to reproduce a certain video signal, the controller 702 reads the signals from the HDD 701. The designation data with regard to the WB control for the recorded video signals is read first. This designation data is detected by the data detection unit 714 and is further inputted to the controller 702.

Then, the controller 702 determines whether the video signal designated to be reproduced is the reference video signal. If this signal is designated as the reference video signal, then the data of this video signal for one frame is read from the HDD 701 and stored in the memory 703. The location data representing the recording area of this video signal is stored in the controller 702. Control is performed on the video data for one frame stored in the memory 703 so that the data corresponding to two lines of the image sensor in the camera unit may be read out at the same time.

Figure 9:
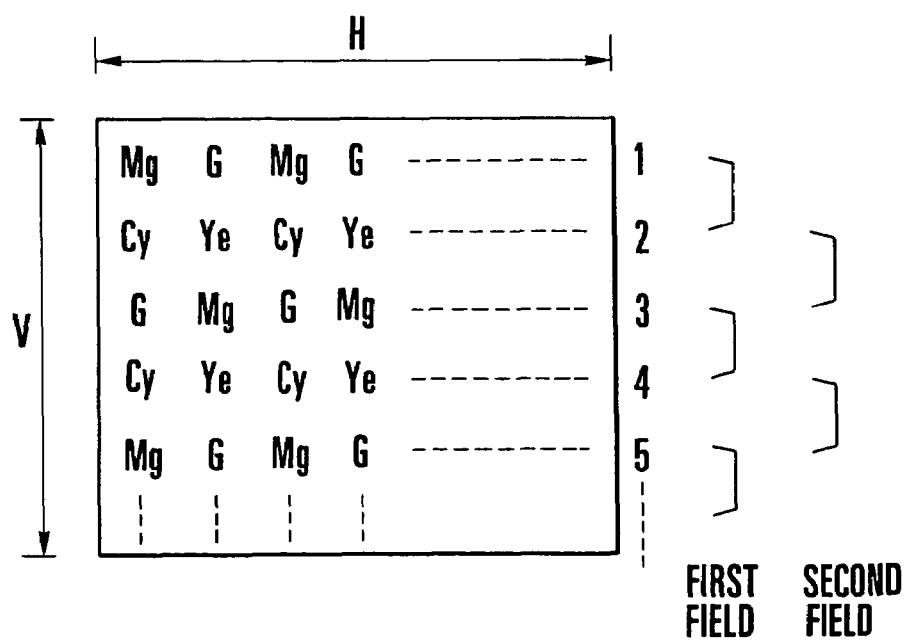
FIG. 9 is a schematic representation illustrating the process for reading signals in the apparatus shown in FIG. 7.

More specifically, as shown in FIG. 9, when the first field is read out, a pair of lines 1 and 2, lines 3 and 4, . . . , or lines 2n+1 and 2(n+1) are read at the same time, and when the second field is read out, a pair of lines 2 and 3, lines 4 and 5, . . . or lines 2n and 2n+1 are read out from the memory 703, and the signals read out are added to each other with the adder 704. The output signal of the adder 704 is applied to the luminance signal processing circuit 705 as well as to the color signal processing circuit 706. In the luminance signal processing circuit 705, the luminance signal is generated from the input signals associated with Mg, G, Cy, and Ye, and the resulting signal is applied to the encoder 709. On the other hand, the color signal processing circuit 706 generates the signals $R_1$, $G_1$ and $B_1$ from the input video signal and provides these signals to the variable gain amplifier 707.

In this situation, the controller 702 relieves holding operation of the hold circuit 716 which controls the gain of the variable gain amplifier 707 so that the output signal of the color temperature detection unit 715 is directly outputted from the hold circuit 716. That is to say, when the present video signal is processed successively after the previous video signal, the latest output signal which was used to process the previous video signal is still provided as the output signal from the color temperature detection unit 715, and this signal is applied as the control input signal via the hold circuit 716 to the variable gain amplifier 707. Gain control of the variable gain amplifier 707 is performed on each amplifier associated with input signals $R_1$, $G_1$, and $B_1$ depending on each gain control signal.

Then, the gain-controlled R, G, and B signals are inputted to the matrix circuit 708 from the variable gain amplifier 707. The matrix circuit 708 produces the R-Y and B-Y signals by using known matrix processing and outputs the resulting signals. The R-Y and B-Y output signals are inputted to the encoder 709 and also to the color temperature detection unit 715. The color temperature detection unit 715 performs integration of the R-Y and B-Y input signals over one field period, and updates via the hold circuit 716 the control signal for the variable gain amplifier 707 every field. Thus, the gains for R, G, and B signals are controlled so that the integrated values of R-Y and B-Y signals become nearly zero. That is to say, a control loop is formed through the variable gain amplifier 707, the matrix circuit 708, the color temperature detection unit 715 and the hold circuit 716, and this control loop functions such that the integrated values taken over a period of one field on R-Y and B-Y signals become nearly zero. Thus, the WB control is performed through this control loop.

The R-Y and B-Y signals as well as the Y signal from the luminance signal processing circuit 705 are inputted to the encoder 709, which produces the composite video signal. The produced composite signal is converted into an analog signal with the D/A converter 710. Then, in the adder 711, the synchronization signal from the controller 702 is added to the output signal from the D/A converter 710 and the resulting signal is applied to the driver 712. The driver 712 outputs this signal as the video signal to be displayed on the monitor 713.

The operation is performed in a manner described above, when the video signal read from the HDD 701 is designated by its associated designation data as the reference video signal. On the other hand, when the video signal is not designated by its associated designation data as the reference video signal, the operation will be performed in such a way as will be described below.

In such a case, it is possible to use the location data recorded as the designation data representing the recording area where the reference video signal for the video signal read from the HDD 701 is recorded. Therefor, the data detection unit 714 detects this location data. This detected location data representing the recording area associated with the video signal is compared with the location data representing the recording area of the video signal stored in the controller 702, that is to say, the location data representing the recording area of the reference video signal which was previously used to perform the WB control. If these data are identical, the controller 702 makes the hold circuit 716 be in holding operation so that the hold circuit 716 holds the value outputted at that time output from the color temperature detection unit 715 and so that the hold circuit 716 continues to output this value to the variable gain amplifier 707. That is to say, by using the same control data without newly re-performing WB control, the WB control will be maintained on the video signal which is about to be read out.

Subsequently, the controller 702 reads the video signal specified to be reproduced from the HDD 701 and writes it in the memory 703. In the similar way to the case described above, the video signal processing is carried out and the driver 712 outputs the video signal on which the reproduction processing has been performed. In this processing, as described above, the WB control is performed without outputting a new signal from the color temperature detection unit 715 to the variable gain amplifier 707 via the hold circuit 716. However, the existing value which has been held at the value of the pervious output signal from the color temperature detection unit 715 is applied to the variable gain amplifier 707. Thus, the control signal is maintained at the constant value.

Now, the operation will be described below for the case where the location data representing the recording area associated with the video signal which is going to be used for the WB control of the video signal to be reproduced is different from the location data stored in the controller 702 representing the recording area associated with the reference video signal previously used for the WB control.

In this case, the controller 702 maintains therein the location data representing the recording area of the video signal used for performing the WB control and the controller 702 reads the reference video signal recorded in this recording area so as to write it in the memory 703. Then, the video signal written in the memory 703 is read out and the WB control is performed on it. That is to say, this time, the controller 702 relieves the holding operation of the hold circuit 716. Thus a new color temperature is detected and the control loop described above becomes in operation for controlling the variable gain amplifier 707. However, in this situation, the controller 702 controls the driver 712 so that the driver 712 becomes in a muting state in which the reproducing video signal is not provided from the output terminal.

When the WB control is completed in a manner as described above, the controller 702 makes the hold circuit 716 be in a holding operation so as to hold the WB control value at that time. Then, the video signal specified to be reproduced is read out from the HDD 701 and written in the memory 703. Then, the signal is read out from the memory 703 and is reproduction-processed without updating the WB control data. Furthermore, the controller 701 relieves the muting state of the driver 712 so as to provide the reproducing video signal from the output terminal.

When signal processing is performed on the video signal for the WB control which is carried out prior to performing of the signal processing on the video signal specified to be reproduced, portions of the video signal may be used, instead of using all of one picture data of the video signal.

Extracting portions from the total video signal may be carried out when the video signal is transferred from the HDD 701 to the memory 703 or when the video signal is read out form the memory 703.

Figure 10:
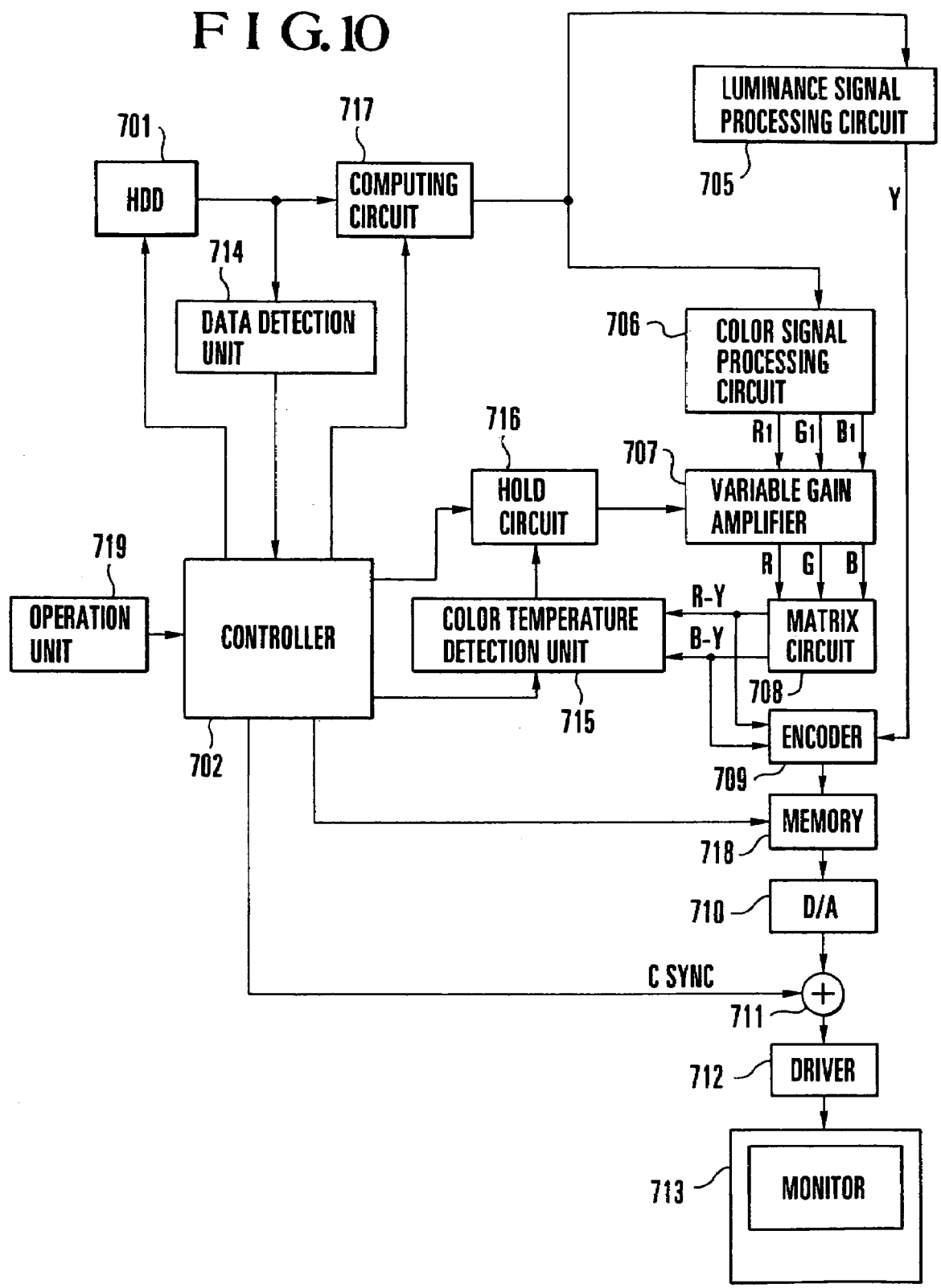
FIG. 10 is a block diagram showing third and fifth embodiments in accordance with the present invention.

FIG. 10 shows a third embodiment in accordance with the present invention. The same or similar elements as those in the case of FIG. 7 are denoted by the same numerals, and these elements will not be explained again.

With reference to FIG. 10, the apparatus in accordance with this embodiment has a computing circuit 717 to which the signal read out from an HDD 701 is provided. This computing circuit 717 has a variable delay line with the maximum delay time corresponding to 1 H (horizontal scanning period) of a CCD shown in FIG. 9, and performs addition between the signals of different lines obtained from the CCD. There is also provided a memory 718 to which the composite video signal is inputted from the encoder 709. Write/read operation to and from the memory 718 is performed under the control of the controller 702.

Now, the operation which will be performed when a command is given to the controller 702 to reproduce a video signal will be described below. First, before reading the video signal from the HDD 701, the controller 702 obtains the designation data associated with the WB control for the video signal from the data detection unit 714. When the designation data obtained from the data detection unit 714 designates a signal as a reference video signal which is recorded in a different area, this designated reference video signal should be read out first. In this reading process, the controller 702 sets the delay time of the variable delay line to ½ H and reads the video signal from the HDD 701 by extracting half the horizontal line. The extracted signal is inputted to the computing circuit 717. The computing circuit 717 performs addition between the data of different lines and outputs the result to the color signal processing circuit 706 as well as to the luminance signal processing circuit 705. In the later processing, the output signal of the color temperature detecting unit 715 will be held so as to produce the WB control data, and, however, at this stage, the output signal of the encoder 709 is not written in the memory 718.

Then, the controller 702 reads the video signal specified to be reproduced from the HDD 701 and sets the delay time of the variable delay line in the computing circuit 717 to 1 H. The addition processing between different line data is performed on the video signal read out in this way and the result is outputted. Furthermore, other processing is performed and the composite video signal is outputted to the memory 718 from the encoder 709. This time, the controller 702 controls the memory 718 so that the output signal of the encoder 709 is written in the memory 718. Thus, the reproduction-processed video signal is written in the memory 718.

Then, the controller 702 reads the video signal from the memory 718. The adder 711 adds this video signal and the synchronizing signal. Then, the signal is outputted as the reproducing image signal from the driver 712 to the monitor 713.

When it is commanded to reproduce another video signal for which a different video signal is designated as the reference video signal, the controller 702 continues to read the signal stored in the memory 718 while the processing is performed to obtain the WB control data, until new control data is obtained. Then, when the signal processing on the video signal specified to be reproduced is performed, the controller updates the contents of the memory 718 so as to switch the output of the reproducing video signal. In this way, the reproducing video signal can be switched without producing a strange feeling.

Now, a fourth embodiment in accordance with the present invention will be described below.

In this embodiment, a plurality of video signals which designate the same reference video signal as the reference video signal used to perform white balance control are taken into one group and are reproduced at the same time on the same screen as shown in FIG. 11. The number of windows (area of sub screen) which can be displayed at the same time may be selected from 4, 9, 16, and 25 with a window number selection switch. As an example, multiple picture reproduction comprising four windows A, B, C, and D as shown in FIG. 11 will be described below.

With reference to FIG. 7, in such a multiple picture reproduction mode, the controller 702 reads the signal from the HDD 701 and the designation data is detected in the data detection unit 714. After the designation data, the reference video signal is read out, and then a video signal which is designated by the designation data as that for which the WB control should be performed using the above reference video signal is transferred to the area in the memory 703 corresponding to the area A of FIG. 11. When the video signal is transferred from the HDD 701 to the memory 703, reduction or partly extracting of the video signal is performed depending on the number of the multiple reproducing windows. In this example, after reducing the data to a half for each of H and V directions, the reduced data is transferred to the memory 703.

Then, the controller 702 further reads from the HDD 701 the designated data in a different recording area and retrieves the video signal included in the same group as that in which the video signal previously transferred to the memory 703 is included.

When the video signal reads the designated data of the video signal included in the same group as a result of the retrieval, subsequently the data is reduced to ½ on this video signal for both of H and V directions and the reduced data is transferred in the area of the memory 703 corresponding to the area B of FIG. 11. Further retrieval is repeated so as to transfer the video signals included in the same group to the areas corresponding to the areas C and D, respectively, after performing the data reduction.

In this way, when these video signals with reduced data size for four windows having one full screen data size as a whole are stored in the memory 703, the controller 702 starts to read the video signals from the memory 703 in a similar manner as in the above case. In this situation, the period of integration processing performed in the color temperature detection unit 715 on the R-Y and B-Y signals provided from the matrix circuit 708 is such a period during which the reference video signal is read from the memory 703, that is to say, the period during which the data corresponding to the area A of FIG. 11 is read out, and thus the color temperature detection is performed by using only this reference video signal. Furthermore, the gain control of the variable gain amplifier 707 is performed via the hold circuit 716. In this way, when the operation in the control loop is settled, the controller 702 makes the hold circuit 716 be in holding operation so that the hold circuit 716 continues to provide the value which is outputted at this time from the color detection unit 715. Based on this output value, the WB control is performed and the gain control of the variable gain amplifier 707 is controlled. Thus, the driver 712 provides the output reproducing video signals with white balance, comprising four windows of multiple screens, so as to display these video signals on the monitor 713 as shown in FIG. 11.

Furthermore, when a command is given to the controller 702 to switch the reproducing signals, the controller 702 retrieves a video signal in different recording areas again and transfers the reference video signal to the memory 703 so as to update the video signal in the area corresponding to the area A. Then, retrieval is continued for the video signal in the HDD 701 so as to successively transfer the data to the areas B, C, D. After that, the video signals are successively read out from the memory 703 so as to make reproduction of multiple pictures.

If the retrieval is completed for all recording areas in the HDD 701 during the retrieval of the video signals, in other words, before the transfer of the video signals to all the areas A, B, C, and D of FIG. 11 is completed, the controller 702 writes gray level signals in the remaining areas.

As described above, reproduction of multiple pictures is done with video signals belonging to a group in which all video signals designate the same reference video data as the video signal to determine the WB control data. In this reproduction, the reference video signal which was designated for the picture in the first window is used to perform WB control. The control data obtained in this way is held and this same control data is further used for other pictures in multiple windows.

When a larger number of multiple windows such as 16 and 25 windows is selected in the multiple picture reproduction, one full screen data of a video signal for performing the WB control is stored in the memory 703 without performing any data reduction, or a predetermined data size of video signal is stored in the memory 703. Then, this video signal is read out from the memory 703 so as to determined the WB control data and the resulting WB control data is held. After that, the video signals for a desired number of windows are stored in the memory 703 after performing data reduction. These stored video signals are read out so as to generate reproducing video signals. In this way, good WB control can be achieved even in multiple picture reproduction with a large number of windows.

A fifth embodiment of the present invention will be described below.

In this embodiment, when a picture is taken, the designation data described above associated with the WB is not recorded. However, when reproduction is performed, the selection is made for each of video signals to be reproduced whether the video signal itself is designated as the reference video signal or another video signal is designated as the reference video signal. The selection switch for this purpose is provided in the operation unit 719. In this embodiment, the circuit is configured as shown in FIG. 10.

When a video signal is specified to be reproduced with the operation unit 719 and this video signal itself is designated as the reference video signal, this video signal is read out from the HDD 701 and the color temperature is detected in a similar manner as in the cases described above, and further the control loop described above is established so as to determine the WB control data. Thus, the reproducing video signal on which WB control is performed using this control data is obtained.

As long as the WB control is performed through the control loop, the video signal which was previously processed and has been stored in the memory 718 shown in FIG. 10 is continuously read out and displayed on the monitor 713.

Next, the operation will be described below in the case where the WB control data is obtained from the specified reference video signal and reproducing processing is carried out based on this control data.

When the operation unit 719 commands the controller 702 to reproduced multiple pictures as shown in FIG. 12, the controller 702 reads video signals from the HDD 701 and performs reproduction processing on these signals in a manner as described above. Thus, WB control and other required processing are performed on the video signals and these video signals are written in the memory 718. In this writing process, after data reduction is performed on the signals outputted from the encoder 709 depending on the number of windows for reproduction of multiple pictures, the reduced video signals are stored in the memory 718. With reference to FIG. 12, as an example, reproduction of multiple pictures comprising 25 windows will be described below, although the number of the windows is not limited to 25. In this case, the signal to be written in the memory 718 is reduced to $\frac{1}{25}$, and then the reduced signal is written. In this writing process, the signal is stored in the area designated by "1" located on the top and left side in FIG. 12, which is one of 25 divided areas from a full screen.

Then, another video signal is read out from the HDD 701. WB control through the WB control loop is performed on this video signal, and then data reduction is carried out and the reduced video signal is stored in the area of the memory 718 shown as "2" in FIG. 2. In a similar manner, video signals are successively stored in the memory 718 at the areas corresponding to those areas denoted by "3"–"25" as shown in FIG. 12. In this way, each of video signals for 25 windows is subjected to WB control and data reduction, then written in the memory 718.

When all of 25 windows are written, the controller 702 reads data from the memory 718 and outputs it. These signals are provided as multiple picture video signals comprising 25 windows to the monitor 713 from the driver 712 via the D/A converter 710. At this stage, watching the screen of the monitor 713, the operator designates a reference video signal to be used to obtain the WB control data. This can be done by specifying the number denoting any of the 25 divided areas. Alternatively, the desired area may be selected with a mouse.

After designating the reference video signal, the operator selects a video signal from 25 windows to be displayed by using the control data obtained from this reference video signal. When the controller 702 receives this command via the operation unit 719, the controller reads the reference video signal again from the HDD 701 and performs WB control on this video signal in a manner as described above. After completion of WB control, the controller 702 makes the hold circuit 716 be in holding operation so as to hold the output of the color temperature detection unit 715. At this time, the processed reference video signal is not written in the memory 718.

Then, the video signal selected to be reproduced is read out from the HDD 701 and processed. In this processing, by using the WB control data obtained by processing the reference video signal, the gain control is performed for each of R, G, and B signals, and then the controlled video signal is stored in the memory 718. When one screen of data is written, the data is read out and displayed on the monitor 713.

As described above, a reference video signal to be used to obtain the WB control data is selected from video signals displayed in multiple windows, then based on the WB control data obtained by processing the selected signal, the reproduction processing is performed on the video signal which is selected to be reproduced. Then, this video signal is displayed on the monitor 713. In this example, the reference video signal is processed again after multiple window reproduction. Instead, the controller 702 may store the control data for each of the video signals obtained when displaying them in multiple windows so as to use the stored control data. That is to say, the control data corresponding to the selected reference video signal is retrieved from the control data stored in the controller 702 for each of the video signals and the obtained control data is used to control the gain of R, G, B signals for the video signal selected to be reproduced.

A way to select a reference video signal by using a small size window inserted in a full screen as in FIG. 13 will be described next.

With the operation unit 719, the above-mentioned reproduction processing is performed picture by picture. An operator watches these pictures on the monitor 713. At this stage, the operator can designate a video signal reproduced on the monitor 713 as a reference video signal to be used to obtain control data. This designation can be done by operating the WB selection switch provided on the operation unit 719. If this WB selection switch is operated, the control data used for processing this video signal displayed on the monitor 713 is held in the hold circuit 716. Furthermore, data is written in the memory 718 so that the video signal reproduced at that time on the screen may be displayed in the small window denoted by A in FIG. 13.

Subsequently, when another video signal is newly selected to be reproduced, this selected video signal is signal-processed using the control data for the video signal displayed in the small window area A, then the selected video signal is stored in the memory 718. Then, the signal is read out from the memory 718, and thus the monitor output is obtained. In this case, reading from the memory 718 is done so that the reproducing signal may be displayed in the area denoted by B in FIG. 13. Display on the monitor 703 is done such that the video signal used to obtain the control data is displayed in the small window area A, and the video signal which is WB-controlled by using the control data obtained from the video signal displayed in the small area is displayed in the area B.

When another video signal is further newly selected to be reproduced, the selected video signal is displayed in the area B. When another different video signal is designated as the signal used to obtain the control data, this newly designated video signal is displayed in the small window area A instead of the previous one, and the control data is also replaced with the new control data obtained from this new video signal.

In each of the above embodiments, WB control is performed by using the integrated value of the color difference signals. However, WB control method is not limited to that. It may also be performed by using R, G, B signals.

The recording medium for recording the video signals is not limited to a hard disk, however, another medium such as a memory card, a magnetic sheet, a magnetic tape, and an optical disk may also be used.

In accordance with the second embodiment of the invention, as described above, WB control in reproduction of a video signal is performed by using control data obtained from a reference video signal designated when the video signal is recorded. Thus, an image of an object even having a large magnitude of color-difference components may be reproduced with good WB control under the same color temperature, by designating the video signal as the reference video signal which is obtained by taking a picture of an object having a small magnitude of color difference such as a white object. In this way, high accuracy WB control is possible in reproduction and even an object having a large magnitude of color difference components may be reproduced without any loss of vividness in color.

In the arrangement according to the third embodiment of the invention, as described above, when video signals recorded on a recording medium are reproduced, an arbitrary video signal may be designated as a reference video signal to obtain WB control data. As a result of this, even video signals for which high accuracy WB control would be impossible by themselves may be reproduced with good enough WB control. In particular, if a picture of a colorless object such as white paper is taken with illumination of the same light source as that with which pictures of usual objects are taken, ideal WB control is possible in reproduction-processing of these usual objects by designating the above video signal of white paper as the reference video signal.

In the arrangement according to the fifth embodiment, a reference video signal and other video signals are displayed in multiple window areas, thus it is possible to make quick retrieval or checking on video signals which are obtained by taking their pictures under similar conditions.

Now, a sixth embodiment in accordance with the present invention will be described hereinbelow.

In automatic WB control method according to the first embodiment described earlier, when a picture is taken of a distant object with a lens having a large focal length, there may be difference in light source between the location of a camera and the location of the object. In such a case, in the arrangement with the external sensor described above, because the color of light in the outside is measured at the location of the camera, WB correction on the object is impossible. On the other hand, in the TTL method described earlier, the color of the object itself leads to large influence. For example, in some cases where an enlarged picture is taken of a monochromatic object with a lens having a large focal length, the color correction is performed on the color of the object itself and no WB correction occurs on the object.

With the imaging apparatus according to this embodiment, wrong automatic WB correction can be avoided even in the case of the long focal length, which will be described in more detail hereinbelow.

Figure 14:
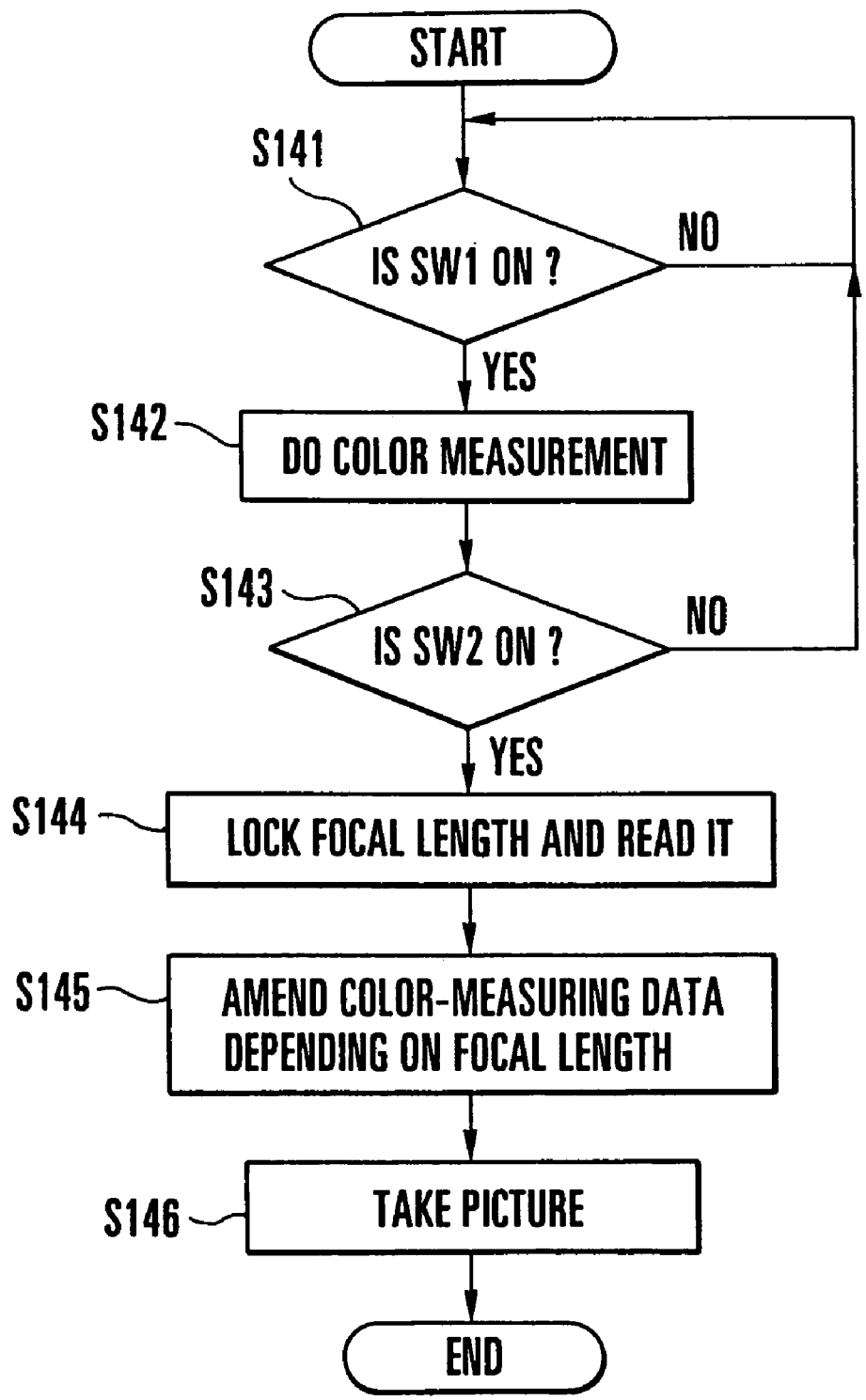
FIG. 14 is a flow chart showing the operation with regard to white balance correction in accordance with the sixth embodiment of the present invention.

In this embodiment, an electronic still camera will also be taken as an example to which the present invention is adapted. The circuit configuration shown in FIG. 1 is used in the embodiment. With reference to the flow chart shown in FIG. 14, WB control in accordance with this embodiment will be described next.

First, in step S141, decision is made whether a switch SW1 (14) is on, and if the conclusion is positive, the routine proceeds to step S142 in which the color is measured with a color sensor 24. Further, in step S143, a decision is made whether a switch SW2 (15) is on, and if the conclusion is positive, the routine proceeds to step S144, and if the conclusion is negative, the routine returns to step S141. In step S144, the focal length of the camera lens 1 is locked and this focal length is read with a system controller 11, and then the routine proceeds to step S145.

In step S145, depending on the focal length obtained in step S144, the system controller 11 modifies the color data obtained in step S142, and then the routine proceeds to step S146. In step S146, the system controller 11 controls a memory controller 9 so as to perform WB correction on the taken image with an image processor 27. Finally, an actual picture is taken.

In arrangement with the external sensor, when the measured value with the color sensor 24 is near to the daylight color, the color data is not modified even if the focal length changes, and in other cases, the color data is limited or modified depending on the change in focal length. In the TTL method, when the measured color value is near to that of color of light source such as daylight, a lamp, and a fluorescent lamp, the color data is not modified regardless of the change in the focal length, and in other cases, the color data is limited or modified depending on the change in the focal length. In the case of a hybrid method, the color measured with the color sensor 24 is compared with the color measured with TT1. When both measured values are similar to each other, the color data is not modified even if the focal length changes, and in other cases, the color data is limited or modified depending on the change in the focal length.

In the arrangement in accordance with this embodiment, the color data is modified depending on the focal length of the camera lens so as to avoid the wrong WB correction occurring in particular when the focal length is large. Thus, good WB is always achieved in reproduction of pictures.

A seventh embodiment in accordance with the present invention will be described hereinbelow.

In addition to the problems described above in the arrangement with the external sensor or TT1, there are possible problems as described below.

In the external WB method, the accuracy of WB control is influenced by the ambient colors and also by the fact that the direction of the light source illuminating an object is not always constant. As a result, the perfect WB reproduction is impossible.

In the TTL method, when a picture is taken in a situation where the color temperature of the light source changes quickly with time as in the case a picture is taken in the natural light in the morning or evening, WB control data obtained by taking a picture of a reference reflection board may be different from that which would be obtained at the real time when an actual still picture is taken, and thus there may exist large errors in WB control in which the error may increase with time.

There will be described hereinbelow an imaging apparatus according to this embodiment, which provides a solution to the above problems.

FIG. 15 is a block diagram showing a configuration of an electronic still camera in accordance with this embodiment. In FIG. 15, there are shown a camera lens 151, an image sensor 152 such as a CCD, an A/D converter 153 for converting the output signals provided from each pixel of the image sensor 152 into a digital signal, an RGB processing circuit 155 for processing the digital pixel data from the output of the A/D converter 153 so as to obtain RGB digital data, a recording medium 156 for recording the RGB digital data from the output of RGB processing circuit 155, and a dating circuit 157 for providing time data representing a date and time.

FIG. 16 shows a color filter arranged in front of the image sensor 152. As shown, this filter comprises Mg (magenta), G (green), Cy (cyan), and Ye (yellow) disposed for each pixel in additive complementary color arrangement.

The operation will be described next.

Before an actual still picture is taken, a picture of a neutral gray reference reflection board is taken and this image is recorded on the recording medium 156 as WB control data together with the time data given from the dating circuit 157. In a case where a plurality of pictures are taken with illumination from the same light source (such as studio illumination and flash lamp) under the same condition, the above WB control data may be used in reproduction for all of these still pictures. In this case, the time data may be used to determine which WB control data should be used.

On the other hand, in a case where the condition of the light source changes quickly with time (as in the case a picture is taken in the natural light in the morning or evening), after the last still picture is taken, a picture of the reference reflection board is taken again to produce the WB control data and the WB control data is recorded together with the time data.

FIG. 17 shows WB control data in a 2-dimensional fashion wherein the levels of R (red) and B (blue) are represented by horizontal and vertical axes, respectively. In FIG. 17, the color temperature goes down to the right and down, and goes up to the left and up.

As an example, let us take the case where the color temperature of the light source decreases with time as in the evening. In FIG. 17, "WB1" denotes the WB control data which was obtained by taking a picture of the reference reflection board before actual pictures were taken. "WB2" denotes the WB control data which was obtained by taking a picture of the reference reflection board at the time the color temperature decreased after actual pictures were taken. The still pictures which were taken between two measurements of the WB control data exist between "WB1" and "WB2" in FIG. 17.

When the pictures are reproduced, the WB control data WB1 and WB2 are determined judging from the time data, and points between two WB1 and WB2 are selected by proper computation. Then, these selected points are used as the WB control data so as to achieve better WB control. On the hand, when it is desired to preserve the effect of the "bright colors of the sunset" and to shift the colors toward the amber-based colors, similar processing is performed between WB2 and WB0 which is on the extension of the segment of the line with WB1 and WB2 so as to achieve the above purposed.

To obtain the WB control data, it is not necessary to use all pixel data comprising a full size picture. Instead, for example, it may be good enough to record just data associated with 8×8 pixels in a central part of a picture for this purpose. Alternatively, the average value of R and B data corresponding to about 10 pixels in a central part of a picture may be used to achieve this purpose.

In each case, management on the WB control data may be done by using ID data such as a frame number instead of the time data. In this case, the dating circuit 157 is not required. It should be understood that the frame number or other similar data is also herein denoted by the term "time data".

Figure 18:
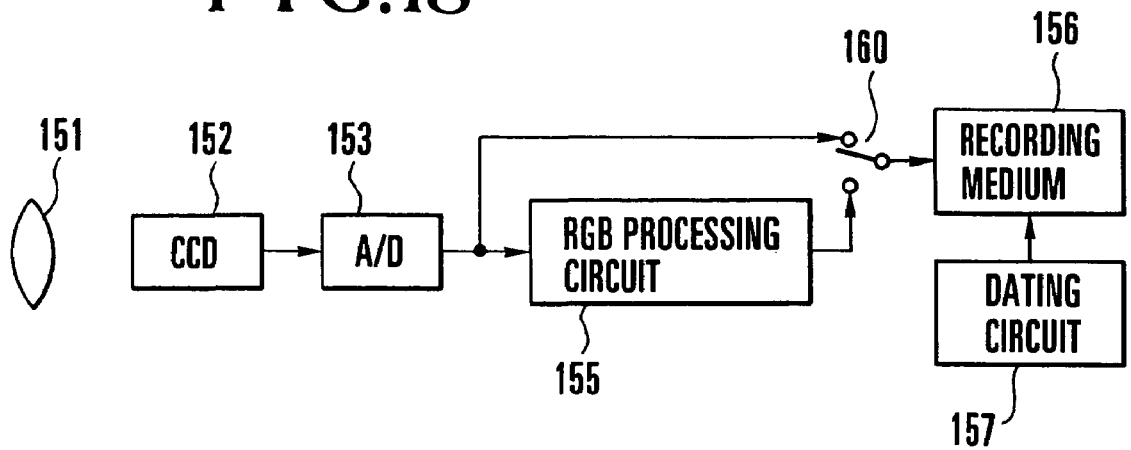
FIG. 18 is a block diagram showing another configuration in accordance with the seventh embodiment of the present invention.

In the embodiments described above, it has been assumed that the image sensor 152 is provided with color filters disposed in the additive complementary color arrangement and there is provided the RGB processing circuit 155. However, the average values of Ye, Cy, and G data in a central part of a picture may be directly recorded as WB control data preserving additive complementary colors. Then, when the picture is reproduced, the R and B values may be calculated from these data as follows: R=Ye−G, B=Cy−G. (It should be noted that the above equations do not include coefficients.) In this case, the circuit may be configured as shown in FIG. 18, wherein a switch 160 (multiplexer) is provided for switching the signals.

Figure 19:
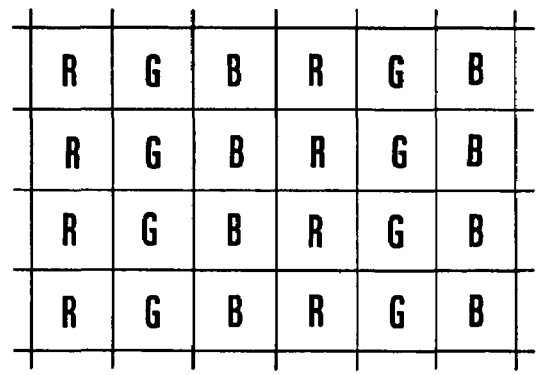
FIG. 19 is a schematic diagram showing a configuration of a color filter with RGB arrangement.
Figure 20:
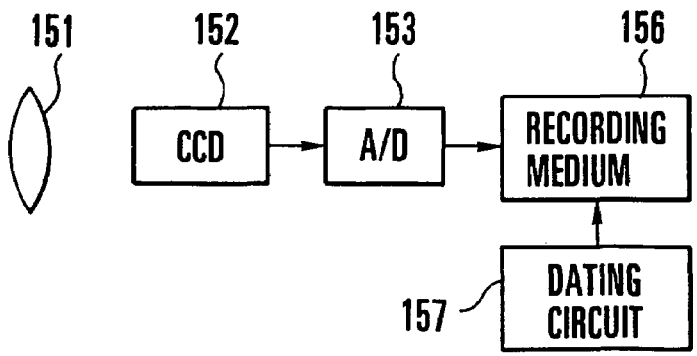
FIG. 20 is a block diagram showing a further configuration in accordance with the seventh embodiment of the present invention.

When the image sensor 152 uses the color filters arranged with RGB primary colors as shown in FIG. 19, the RGB processing circuit 155 is not required both in taking a picture and in obtaining WB control data. In this case, the circuit may be configured as shown in FIG. 20.

With the arrangement in accordance with this embodiment, the WB control data is detected and recorded together with the time data. Furthermore, when the WB control data is required to be detected in reproduction, the still picture is identified by using the time data, and the WB adjustment can be accurately performed by using the corresponding WB control data.

Moreover, in another aspect of this embodiment, the WB control data are detected before and after taking pictures, and the obtained WB control data are recorded together with the time data. These two WB control data can be used to perform proper WB adjustment for a plurality of the still pictures which were taken with illumination of a light source changing with the time between these WB control data.

What is claimed is:

1. An image pickup apparatus, comprising:
   (a) image pickup means;
   (b) first memory means for storing an image signal outputted from said image pickup means and condition information representing a condition in which an image signal is picked up by said image pickup means;
   (c) second memory means capable of storing the image signal with the condition information, said second memory means being detachably attached to said apparatus;
   (d) third memory means capable of storing the image signal with the condition information, said third memory means being detachably attached to said apparatus;
   (e) signal processing means for performing a predetermined processing on the image signal on the basis of the condition information; and
   (f) control means for controlling the condition information so as to be copied from said second memory means to said first memory means when said second memory means is detached from said apparatus to continue the image pickup operation, and for controlling the condition information which is copied from said second memory means and memorized in said first memory means so as to be copied to said third memory means when said third memory means is attached to said apparatus.

2. An apparatus according to claim 1, wherein the condition information includes white balance control data associated with the image signal.

3. An apparatus according to claim 1, wherein said second memory means includes a magnetic disk.

4. An image reproduction apparatus for reproducing an image data stored in a detachable recording medium recording a plurality of image data together with a designation data that indicates which of a plurality of image data is standard image data, comprising:
   a control device adapted to select an image data as the standard image data which is an image of a white object of the plurality of image data, on the basis of the designation data recorded on said recording medium, and
   an image processing device adapted to generate a control value, on the basis of said standard image data, and process the plurality of image data by using the control value.

5. An apparatus according to claim 4, further comprising a display processing device for displaying a reproduced image of the standard image data as well as the standard image data on the same image window.

6. An apparatus according to claim 4, further comprising a display processing device for displaying a reproduced image of the image data processed by said image processing device among the plurality of image data on a same image window.

7. An image pickup apparatus for picking up images of objects to record a plurality of image data on a detachable recording medium, comprising:
   a designating device adapted to designate an image data, which is an image of a white object, of the plurality of image data, recorded on said recording medium, as a standard image data on the basis of which a control value for processing the plurality of image data in an image reproduction apparatus is generated; and
   a designated image data recording device adapted to record a designating data that indicates which of a plurality of image data is the standard image data.

8. A method of image reproduction for reproducing an image data stored in a detachable recording medium recording a plurality of image data together with a designation data that indicates which of a plurality of image data is standard image data, comprising:
   selecting an image data as said standard image data, which is an image of a white object, of the plurality of image data on the basis of the designation data recorded on said recording medium;
   generating a control value for processing the plurality of image data, on the basis of said standard image data; and
   processing the plurality of image data by using the control value.

9. A method according to claim 8, further comprising displaying a reproduced image of the standard image data on a same image window.

10. A method according to claim 8, further comprising displaying a reproduced image of the image data processed by using the control value among the plurality of image data on a same image window.

11. A method for recording a plurality of picked up image data on a detachable recording medium, comprising:
   designating an image data of the plurality of the image data, recorded on said recording medium, as a standard image data, which is an image of a white object, on the basis of which a control value for processing the plurality of image data in an image reproduction apparatus is generated; and
   recording a designating data including information which of a plurality of image data is the standard image data.

12. An apparatus according to claim 4, wherein said control value is a white balance control value.

13. An apparatus according to claim 7 wherein said control value is a white balance control value.

14. A method according to claim 8, wherein said control value is a white balance control value.

15. A method according to claim 11, wherein said control value is a white balance control value.

* * * * *

UNITED STATES PATENT AND TRADEMARK OFFICE
CERTIFICATE OF CORRECTION

PATENT NO. : 6,965,405 B1
APPLICATION NO. : 08/818245
DATED : November 15, 2005
INVENTOR(S) : Hiroyuki Ogino et al.

It is certified that error appears in the above-identified patent and that said Letters Patent is hereby corrected as shown below:

Column 1, line 42, delete "performed WB" and insert --perform WB--

Signed and Sealed this

Twenty-eighth Day of November, 2006

JON W. DUDAS
*Director of the United States Patent and Trademark Office*